(12) United States Patent
Kleinbeck et al.

(10) Patent No.: US 12,456,380 B1
(45) Date of Patent: *Oct. 28, 2025

(54) UNMANNED VEHICLE RECOGNITION AND THREAT MANAGEMENT

(71) Applicant: Digital Global Systems, Inc., Tysons Corner, VA (US)

(72) Inventors: David William Kleinbeck, Lees Summit, MO (US); Armando Montalvo, Winter Garden, FL (US)

(73) Assignee: Digital Global Systems, Inc., Tysons Corner, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 19/261,299

(22) Filed: Jul. 7, 2025

Related U.S. Application Data

(63) Continuation of application No. 19/098,376, filed on Apr. 2, 2025, now Pat. No. 12,387,608, which is a
(Continued)

(51) Int. Cl.
*G08G 5/22* (2025.01)
*G01S 3/04* (2006.01)
(Continued)

(52) U.S. Cl.
CPC ............ *G08G 5/22* (2025.01); *G01S 3/043* (2013.01); *G01S 3/046* (2013.01); *G01S 3/46* (2013.01);
(Continued)

(58) Field of Classification Search
CPC ............ G01S 3/043; G01S 3/046; G01S 3/46; G06N 20/00; G06N 20/10; G06N 3/08;
(Continued)

(56) References Cited

U.S. PATENT DOCUMENTS 4,215,345 A 7/1980 Robert et al.
4,400,700 A 8/1983 Rittenbach
(Continued)

FOREIGN PATENT DOCUMENTS

CN 110035440 A 7/2019
CN 115482071 A 12/2022
(Continued)

OTHER PUBLICATIONS

"A Hardware Design for Time Delay Estimation of TDOA"; Li et al.; 2013 IEEE International Conference on Signal Processing, Communication and Computing (ICSPCC 2013); Aug. 2013 (Year: 2013).

(Continued)

*Primary Examiner* — Nguyen T Vo
(74) *Attorney, Agent, or Firm* — NEO IP

(57) ABSTRACT

Systems and methods for automated unmanned aerial vehicle recognition. A multiplicity of receivers captures RF data and transmits the RF data to at least one node device. The at least one node device comprises a signal processing engine, a detection engine, a classification engine, and a direction finding engine. The at least one node device is configured with an artificial intelligence algorithm. The detection engine and classification engine are trained to detect and classify signals from unmanned vehicles and their controllers based on processed data from the signal processing engine. The direction finding engine is operable to provide lines of bearing for detected unmanned vehicles.

20 Claims, 23 Drawing Sheets

Related U.S. Application Data continuation of application No. 18/985,777, filed on Dec. 18, 2024, now Pat. No. 12,307,905, which is a continuation of application No. 18/789,011, filed on Jul. 30, 2024, now Pat. No. 12,243,431, which is a continuation of application No. 18/785,936, filed on Jul. 26, 2024, now Pat. No. 12,205,477, which is a continuation-in-part of application No. 18/775,710, filed on Jul. 17, 2024, now Pat. No. 12,183,213, which is a continuation-in-part of application No. 18/428,606, filed on Jan. 31, 2024, now Pat. No. 12,266,272, which is a continuation of application No. 18/374,376, filed on Sep. 28, 2023, now Pat. No. 11,893,893, which is a continuation of application No. 18/142,904, filed on May 3, 2023, now Pat. No. 11,783,712, which is a continuation of application No. 17/991,348, filed on Nov. 21, 2022, now Pat. No. 11,645,921, which is a continuation of application No. 17/735,615, filed on May 3, 2022, now Pat. No. 11,521,498, which is a continuation of application No. 17/190,048, filed on Mar. 2, 2021, now Pat. No. 11,328,609, which is a continuation of application No. 16/732,811, filed on Jan. 2, 2020, now Pat. No. 10,943,493, which is a continuation of application No. 16/275,575, filed on Feb. 14, 2019, now Pat. No. 10,529,241, which is a continuation-in-part of application No. 16/274,933, filed on Feb. 13, 2019, now Pat. No. 10,498,951, which is a continuation-in-part of application No. 16/180,690, filed on Nov. 5, 2018, now Pat. No. 10,459,020, which is a continuation-in-part of application No. 15/412,982, filed on Jan. 23, 2017, now Pat. No. 10,122,479.

(60) Provisional application No. 62/722,420, filed on Aug. 24, 2018, provisional application No. 62/632,276, filed on Feb. 19, 2018.

(51) Int. Cl.
| | | |
|---|---|---|
| *G01S 3/46* | (2006.01) | |
| *G06N 3/08* | (2023.01) | |
| *G06N 7/01* | (2023.01) | |
| *G08G 5/55* | (2025.01) | |
| *G08G 5/57* | (2025.01) | |

(52) U.S. Cl.
CPC ............... *G06N 3/08* (2013.01); *G06N 7/01* (2023.01); *G08G 5/55* (2025.01); *G08G 5/57* (2025.01)

(58) Field of Classification Search
CPC .. G06N 7/01; G08G 5/22; G08G 5/55; G08G 5/57
See application file for complete search history.

(56) References Cited

U.S. PATENT DOCUMENTS

| | | |
|---|---|---|
| 4,453,137 A | 6/1984 | Rittenbach |
| 4,501,020 A | 2/1985 | Wakeman |
| 4,581,769 A | 4/1986 | Grimsley et al. |
| 4,638,493 A | 1/1987 | Bishop et al. |
| 4,676,641 A | 6/1987 | Bott |
| 4,781,460 A | 11/1988 | Bott |
| 4,794,325 A | 12/1988 | Britton et al. |
| 4,928,106 A | 5/1990 | Ashjaee et al. |
| 5,103,402 A | 4/1992 | Morton et al. |
| 5,126,654 A | 6/1992 | Murphy et al. |
| 5,134,407 A | 7/1992 | Lorenz et al. |
| 5,144,642 A | 9/1992 | Weinberg et al. |
| 5,166,664 A | 11/1992 | Fish |
| 5,230,087 A | 7/1993 | Meyer et al. |
| 5,293,170 A | 3/1994 | Lorenz et al. |
| 5,343,212 A | 8/1994 | Rose et al. |
| 5,393,713 A | 2/1995 | Schwob |
| 5,416,593 A | 5/1995 | Vercruysse |
| 5,448,309 A | 9/1995 | Won |
| 5,506,864 A | 4/1996 | Schilling |
| 5,513,385 A | 4/1996 | Tanaka |
| 5,548,809 A | 8/1996 | Lemson |
| 5,570,099 A | 10/1996 | DesJardins |
| 5,589,835 A | 12/1996 | Gildea et al. |
| 5,612,703 A | 3/1997 | Mallinckrodt |
| 5,642,732 A | 7/1997 | Wang |
| 5,831,874 A | 11/1998 | Boone et al. |
| 5,835,857 A | 11/1998 | Otten |
| 5,838,906 A | 11/1998 | Doyle et al. |
| 5,846,208 A | 12/1998 | Pichlmayr et al. |
| 5,856,803 A | 1/1999 | Pevler |
| 5,936,575 A | 8/1999 | Azzarelli et al. |
| 6,018,312 A | 1/2000 | Haworth |
| 6,039,692 A | 3/2000 | Kristoffersen |
| 6,085,090 A | 7/2000 | Yee et al. |
| 6,115,580 A | 9/2000 | Chuprun et al. |
| 6,134,445 A | 10/2000 | Gould et al. |
| 6,144,336 A | 11/2000 | Preston et al. |
| 6,157,619 A | 12/2000 | Ozluturk et al. |
| 6,160,511 A | 12/2000 | Pfeil et al. |
| 6,167,277 A | 12/2000 | Kawamoto |
| 6,167,359 A | 12/2000 | Demir et al. |
| 6,185,309 B1 | 2/2001 | Attias |
| 6,188,715 B1 | 2/2001 | Partyka |
| 6,191,731 B1 | 2/2001 | McBurney et al. |
| 6,198,414 B1 | 3/2001 | McPherson et al. |
| 6,249,252 B1 | 6/2001 | Dupray |
| 6,286,021 B1 | 9/2001 | Tran et al. |
| 6,296,612 B1 | 10/2001 | Mo et al. |
| 6,304,760 B1 | 10/2001 | Thomson et al. |
| 6,314,366 B1 | 11/2001 | Farmakis et al. |
| 6,339,396 B1 | 1/2002 | Mayersak |
| 6,384,776 B1 | 5/2002 | Martin |
| 6,400,647 B1 | 6/2002 | Huntress |
| 6,418,131 B1 | 7/2002 | Snelling et al. |
| 6,430,418 B1 | 8/2002 | Nivens et al. |
| 6,433,671 B1 | 8/2002 | Nysen |
| 6,490,318 B1 | 12/2002 | Larsson et al. |
| 6,492,945 B2 | 12/2002 | Counselman, III et al. |
| 6,512,788 B1 | 1/2003 | Kuhn et al. |
| 6,628,231 B2 | 9/2003 | Mayersak |
| 6,677,895 B1 | 1/2004 | Holt |
| 6,697,439 B1 | 2/2004 | Trivedi et al. |
| 6,707,910 B1 | 3/2004 | Valve et al. |
| 6,711,404 B1 | 3/2004 | Arpee et al. |
| 6,741,595 B2 | 5/2004 | Maher et al. |
| 6,771,957 B2 | 8/2004 | Chitrapu |
| 6,785,321 B1 | 8/2004 | Yang et al. |
| 6,834,180 B1 | 12/2004 | Marshall |
| 6,850,557 B1 | 2/2005 | Gronemeyer |
| 6,850,735 B2 | 2/2005 | Sugar et al. |
| 6,859,831 B1 | 2/2005 | Gelvin et al. |
| 6,861,982 B2 | 3/2005 | Forstrom et al. |
| 6,876,326 B2 | 4/2005 | Martorana |
| 6,898,197 B1 | 5/2005 | Lavean |
| 6,898,235 B1 | 5/2005 | Carlin et al. |
| 6,904,269 B1 | 6/2005 | Deshpande et al. |
| 6,985,437 B1 | 1/2006 | Vogel |
| 6,991,514 B1 | 1/2006 | Meloni et al. |
| 7,035,593 B2 | 4/2006 | Miller et al. |
| 7,043,207 B2 | 5/2006 | Miyazaki |
| 7,049,965 B2 | 5/2006 | Kelliher et al. |
| 7,110,756 B2 | 9/2006 | Diener |
| 7,116,943 B2 | 10/2006 | Sugar et al. |
| 7,146,176 B2 | 12/2006 | Mchenry |
| 7,151,790 B1 | 12/2006 | Patenaude et al. |
| 7,151,938 B2 | 12/2006 | Weigand |
| 7,152,025 B2 | 12/2006 | Lusky et al. |
| 7,162,207 B2 | 1/2007 | Kursula et al. |
| 7,171,161 B2 | 1/2007 | Miller |
| 7,187,326 B2 | 3/2007 | Beadle et al. |

(56) References Cited

U.S. PATENT DOCUMENTS

| | | |
|---|---|---|
| 7,206,350 B2 | 4/2007 | Korobkov et al. |
| 7,215,716 B1 | 5/2007 | Smith |
| 7,254,191 B2 | 8/2007 | Sugar et al. |
| 7,269,151 B2 | 9/2007 | Diener et al. |
| 7,289,733 B1 | 10/2007 | He |
| 7,292,656 B2 | 11/2007 | Kloper et al. |
| 7,298,327 B2 | 11/2007 | Dupray et al. |
| 7,340,375 B1 | 3/2008 | Patenaud et al. |
| 7,366,463 B1 | 4/2008 | Archer et al. |
| 7,408,907 B2 | 8/2008 | Diener |
| 7,424,268 B2 | 9/2008 | Diener et al. |
| 7,428,270 B1 | 9/2008 | Dubuc et al. |
| 7,430,254 B1 | 9/2008 | Anderson |
| 7,459,898 B1 | 12/2008 | Woodings |
| 7,466,960 B2 | 12/2008 | Sugar |
| 7,471,683 B2 | 12/2008 | Maher, III et al. |
| 7,522,917 B1 | 4/2009 | Purdy, Jr. et al. |
| 7,555,262 B2 | 6/2009 | Brenner |
| 7,564,816 B2 | 7/2009 | Mchenry et al. |
| 7,595,754 B2 | 9/2009 | Mehta |
| 7,606,335 B2 | 10/2009 | Kloper et al. |
| 7,606,597 B2 | 10/2009 | Weigand |
| 7,620,396 B2 | 11/2009 | Floam et al. |
| 7,653,020 B2 | 1/2010 | Roberts |
| 7,676,192 B1 | 3/2010 | Wilson |
| 7,692,532 B2 | 4/2010 | Fischer et al. |
| 7,692,573 B1 | 4/2010 | Funk |
| 7,702,044 B2 | 4/2010 | Nallapureddy et al. |
| 7,725,110 B2 | 5/2010 | Weigand |
| 7,728,755 B1 | 6/2010 | Jocic |
| 7,801,490 B1 | 9/2010 | Scherzer |
| 7,813,742 B1 | 10/2010 | Mitchell |
| 7,835,319 B2 | 11/2010 | Sugar |
| 7,865,140 B2 | 1/2011 | Levien et al. |
| 7,893,875 B1 | 2/2011 | Smith |
| 7,929,508 B1 | 4/2011 | Yucek et al. |
| 7,933,344 B2 | 4/2011 | Hassan et al. |
| 7,945,215 B2 | 5/2011 | Tang |
| 7,953,549 B2 | 5/2011 | Graham et al. |
| 7,965,641 B2 | 6/2011 | Ben Letaief et al. |
| 8,001,901 B2 | 8/2011 | Bass |
| 8,006,195 B1 | 8/2011 | Woodings et al. |
| 8,023,957 B2 | 9/2011 | Weigand |
| 8,026,846 B2 | 9/2011 | Mcfadden et al. |
| 8,027,249 B2 | 9/2011 | Mchenry et al. |
| 8,027,690 B2 | 9/2011 | Shellhammer |
| 8,045,654 B1 | 10/2011 | Anderson |
| 8,045,660 B1 | 10/2011 | Gupta |
| 8,055,204 B2 | 11/2011 | Livsics et al. |
| 8,059,694 B2 | 11/2011 | Junell et al. |
| 8,060,017 B2 | 11/2011 | Schlicht et al. |
| 8,060,035 B2 | 11/2011 | Haykin |
| 8,060,104 B2 | 11/2011 | Chaudhri et al. |
| 8,064,840 B2 | 11/2011 | McHenry et al. |
| 8,077,662 B2 | 12/2011 | Srinivasan et al. |
| RE43,066 E | 1/2012 | McHenry |
| 8,094,610 B2 | 1/2012 | Wang et al. |
| 8,107,391 B2 | 1/2012 | Wu et al. |
| 8,125,213 B2 | 2/2012 | Goguillon et al. |
| 8,131,239 B1 | 3/2012 | Walker et al. |
| 8,134,493 B2 | 3/2012 | Noble et al. |
| 8,151,311 B2 | 4/2012 | Huffman et al. |
| 8,155,039 B2 | 4/2012 | Wu et al. |
| 8,155,649 B2 | 4/2012 | McHenry et al. |
| 8,160,839 B1 | 4/2012 | Woodings et al. |
| 8,170,577 B2 | 5/2012 | Singh |
| 8,175,539 B2 | 5/2012 | Diener et al. |
| 8,184,653 B2 | 5/2012 | Dain et al. |
| 8,193,981 B1 | 6/2012 | Hwang et al. |
| 8,213,868 B2 | 7/2012 | Du et al. |
| 8,224,254 B2 | 7/2012 | Haykin |
| 8,229,368 B1 | 7/2012 | Immendorf et al. |
| 8,233,928 B2 | 7/2012 | Stanforth et al. |
| 8,238,247 B2 | 8/2012 | Wu et al. |
| 8,249,028 B2 | 8/2012 | Porras et al. |
| 8,249,631 B2 | 8/2012 | Sawai |
| 8,260,207 B2 | 9/2012 | Srinivasan et al. |
| 8,265,684 B2 | 9/2012 | Sawai |
| 8,279,786 B1 | 10/2012 | Smith et al. |
| 8,280,433 B2 | 10/2012 | Quinn et al. |
| 8,289,907 B2 | 10/2012 | Seidel et al. |
| 8,290,503 B2 | 10/2012 | Sadek et al. |
| 8,295,859 B1 | 10/2012 | Yarkan et al. |
| 8,295,877 B2 | 10/2012 | Hui et al. |
| 8,301,075 B2 | 10/2012 | Sherman et al. |
| 8,305,215 B2 | 11/2012 | Markhovsky et al. |
| 8,311,483 B2 | 11/2012 | Tillman et al. |
| 8,311,509 B2 | 11/2012 | Feher |
| 8,315,571 B2 | 11/2012 | Lindoff et al. |
| 8,320,910 B2 | 11/2012 | Bobier |
| 8,326,240 B1 | 12/2012 | Kadambe et al. |
| 8,326,309 B2 | 12/2012 | Mody et al. |
| 8,326,313 B2 | 12/2012 | McHenry et al. |
| 8,335,204 B2 | 12/2012 | Samarasooriya et al. |
| 8,346,273 B2 | 1/2013 | Weigand |
| 8,350,970 B2 | 1/2013 | Birkett et al. |
| 8,352,223 B1 | 1/2013 | Anthony et al. |
| 8,358,723 B1 | 1/2013 | Hamkins et al. |
| 8,364,188 B2 | 1/2013 | Srinivasan et al. |
| 8,369,305 B2 | 2/2013 | Diener et al. |
| 8,373,759 B2 | 2/2013 | Samarasooriya et al. |
| 8,391,794 B2 | 3/2013 | Sawai et al. |
| 8,391,796 B2 | 3/2013 | Srinivasan et al. |
| 8,401,564 B2 | 3/2013 | Singh |
| 8,406,776 B2 | 3/2013 | Jallon |
| 8,406,780 B2 | 3/2013 | Mueck |
| RE44,142 E | 4/2013 | Wilson |
| 8,421,676 B2 | 4/2013 | Moshfeghi |
| 8,422,453 B2 | 4/2013 | Abedi |
| 8,422,958 B2 | 4/2013 | Du et al. |
| RE44,237 E | 5/2013 | Mchenry |
| 8,437,700 B2 | 5/2013 | Mody et al. |
| 8,442,445 B2 | 5/2013 | Mody et al. |
| 8,447,237 B2 | 5/2013 | Reial et al. |
| 8,451,751 B2 | 5/2013 | Challapali et al. |
| 8,463,195 B2 | 6/2013 | Shellhammer |
| 8,467,353 B2 | 6/2013 | Proctor |
| 8,467,996 B2 | 6/2013 | Perez et al. |
| 8,483,155 B1 | 7/2013 | Banerjea et al. |
| 8,494,464 B1 | 7/2013 | Kadambe et al. |
| 8,503,955 B2 | 8/2013 | Kang et al. |
| 8,504,087 B2 | 8/2013 | Stanforth et al. |
| 8,514,729 B2 | 8/2013 | Blackwell |
| 8,515,473 B2 | 8/2013 | Mody et al. |
| 8,520,606 B2 | 8/2013 | Cleveland |
| RE44,492 E | 9/2013 | Mchenry |
| 8,526,974 B2 | 9/2013 | Olsson et al. |
| 8,532,686 B2 | 9/2013 | Schmidt et al. |
| 8,538,339 B2 | 9/2013 | Hu et al. |
| 8,548,521 B2 | 10/2013 | Hui et al. |
| 8,554,264 B1 | 10/2013 | Gibbons et al. |
| 8,559,301 B2 | 10/2013 | Mchenry et al. |
| 8,565,811 B2 | 10/2013 | Tan et al. |
| 8,599,024 B2 | 12/2013 | Bloy |
| 8,718,838 B2 | 5/2014 | Kokkeby et al. |
| 8,761,051 B2 | 6/2014 | Brisebois et al. |
| 8,773,966 B1 | 7/2014 | Petrovic et al. |
| 8,780,968 B1 | 7/2014 | Garcia et al. |
| 8,792,901 B2 | 7/2014 | Schmidt |
| 8,798,548 B1 | 8/2014 | Carbajal |
| 8,805,291 B1 | 8/2014 | Garcia et al. |
| 8,818,283 B2 | 8/2014 | McHenry et al. |
| 8,824,536 B1 | 9/2014 | Garcia et al. |
| 8,843,155 B2 | 9/2014 | Burton et al. |
| 8,886,210 B1 | 11/2014 | Sugar |
| 8,941,491 B2 | 1/2015 | Polk et al. |
| 8,977,212 B2 | 3/2015 | Carbajal |
| 9,007,262 B1 | 4/2015 | Witzgall |
| 9,008,587 B2 | 4/2015 | Carbajal |
| 9,078,162 B2 | 7/2015 | Garcia et al. |
| 9,143,968 B1 | 9/2015 | Manku et al. |
| 9,185,591 B2 | 11/2015 | Carbajal |
| 9,229,102 B1 | 1/2016 | Wright et al. |
| 9,245,378 B1 | 1/2016 | Villagomez et al. |

(56) References Cited

U.S. PATENT DOCUMENTS

| | | | |
|---|---|---|---|
| 9,288,683 B2 | 3/2016 | Garcia et al. |
| 9,356,727 B2 | 5/2016 | Immendorf et al. |
| 9,397,619 B2 | 7/2016 | Lozhkin |
| 9,412,278 B1 | 8/2016 | Gong et al. |
| 9,413,574 B1 | 8/2016 | Timofeev et al. |
| 9,414,237 B2 | 8/2016 | Garcia et al. |
| 9,439,078 B2 | 9/2016 | Menon et al. |
| 9,466,881 B1 | 10/2016 | Berry et al. |
| 9,529,360 B1 | 12/2016 | Melamed et al. |
| 9,537,586 B2 | 1/2017 | Carbajal |
| 9,538,040 B2 | 1/2017 | Goergen et al. |
| 9,572,055 B2 | 2/2017 | Immendorf et al. |
| 9,635,669 B2 | 4/2017 | Gormley et al. |
| 9,658,341 B2 | 5/2017 | Mathews et al. |
| 9,674,684 B1 | 6/2017 | Mendelson |
| 9,674,836 B2 | 6/2017 | Gormley et al. |
| 9,686,789 B2 | 6/2017 | Gormley et al. |
| 9,715,009 B1 | 7/2017 | Parker et al. |
| 9,749,069 B2 | 8/2017 | Garcia et al. |
| 9,755,972 B1 | 9/2017 | Mao et al. |
| 9,767,699 B1 | 9/2017 | Borghese et al. |
| 9,769,834 B2 | 9/2017 | Immendorf et al. |
| 9,805,273 B1 | 10/2017 | Seeber et al. |
| 9,819,441 B2 | 11/2017 | Immendorf et al. |
| 9,858,947 B2 | 1/2018 | Hearing et al. |
| 9,862,489 B1 | 1/2018 | Weinstein et al. |
| 9,923,700 B2 | 3/2018 | Gormley et al. |
| 9,942,775 B2 | 4/2018 | Yun et al. |
| 9,973,278 B2 | 5/2018 | Wang et al. |
| 9,989,633 B1 | 6/2018 | Pandey et al. |
| 9,998,243 B2 | 6/2018 | Garcia et al. |
| 10,027,429 B1 | 7/2018 | Kiannejad |
| 10,104,559 B2 | 10/2018 | Immendorf et al. |
| 10,157,548 B2 | 12/2018 | Priest |
| 10,194,324 B2 | 1/2019 | Yun et al. |
| 10,198,955 B1 | 2/2019 | Boyd et al. |
| 10,227,429 B2 | 3/2019 | Watanabe et al. |
| 10,235,523 B1 | 3/2019 | Keller, III et al. |
| 10,241,140 B2 | 3/2019 | Moinuddin |
| 10,251,242 B1 | 4/2019 | Rosen et al. |
| 10,281,570 B1 | 5/2019 | Parker et al. |
| 10,389,616 B2 | 8/2019 | Ryan et al. |
| 10,393,784 B2 | 8/2019 | Logan et al. |
| 10,408,936 B2 | 9/2019 | Van Voorst |
| 10,459,020 B2 | 10/2019 | Dzierwa et al. |
| 10,529,241 B2 * | 1/2020 | Kleinbeck ............... G06N 3/08 |
| 10,540,905 B2 | 1/2020 | Bohanan et al. |
| 10,552,738 B2 | 2/2020 | Holt et al. |
| 10,587,352 B2 | 3/2020 | Kiannejad |
| 10,594,034 B1 | 3/2020 | Tran et al. |
| 10,613,209 B2 | 4/2020 | Emami et al. |
| 10,642,813 B1 | 5/2020 | Lazier et al. |
| 10,698,076 B2 | 6/2020 | Jones et al. |
| 10,700,721 B2 | 6/2020 | Ayala et al. |
| 10,701,574 B2 | 6/2020 | Gormley et al. |
| 10,764,718 B1 | 9/2020 | Boettcher et al. |
| 10,784,974 B2 | 9/2020 | Menon |
| 10,811,771 B1 | 10/2020 | Tran et al. |
| 10,907,940 B1 | 2/2021 | Parker et al. |
| 10,916,845 B2 | 2/2021 | Tran et al. |
| 10,917,797 B2 | 2/2021 | Menon et al. |
| 10,943,493 B2 * | 3/2021 | Kleinbeck ............... G06N 7/01 |
| 11,012,340 B2 | 5/2021 | Ryan et al. |
| 11,035,929 B2 | 6/2021 | Parker et al. |
| 11,063,653 B2 | 7/2021 | Ottersten et al. |
| 11,190,233 B2 | 11/2021 | Lo et al. |
| 11,223,431 B2 | 1/2022 | Garcia et al. |
| 11,265,652 B2 | 3/2022 | Kallai et al. |
| 11,321,282 B2 | 5/2022 | Tran |
| 11,334,807 B1 | 5/2022 | O'Shea et al. |
| 11,336,011 B2 | 5/2022 | Tran et al. |
| 11,516,071 B2 | 11/2022 | Karapantelakis et al. |
| 11,637,641 B1 | 4/2023 | Garcia et al. |
| 11,663,992 B2 | 5/2023 | Canberk et al. |
| 11,671,839 B2 | 6/2023 | Guo et al. |
| 11,700,304 B2 | 7/2023 | Brown, Jr. et al. |
| 11,757,185 B2 | 9/2023 | Tran et al. |
| 11,777,783 B2 | 10/2023 | Meirosu et al. |
| 11,791,913 B2 | 10/2023 | Garcia et al. |
| 11,871,103 B2 | 1/2024 | Kleinbeck |
| 11,874,674 B2 | 1/2024 | Groden et al. |
| 11,880,888 B1 | 1/2024 | Gold et al. |
| 11,889,351 B2 | 1/2024 | Tagg |
| 11,910,305 B2 | 2/2024 | Buyukdura |
| 12,095,518 B2 | 9/2024 | Garcia et al. |
| 12,156,037 B2 | 11/2024 | Montalvo |
| 12,183,213 B1 | 12/2024 | Kleinbeck et al. |
| 12,184,963 B2 | 12/2024 | Kleinbeck |
| 12,243,431 B2 * | 3/2025 | Kleinbeck ............... G06N 3/08 |
| 12,307,905 B2 * | 5/2025 | Kleinbeck ............... G08G 5/22 |
| 12,387,608 B1 * | 8/2025 | Kleinbeck ............... G01S 3/046 |
| 2001/0000959 A1 | 5/2001 | Campana et al. |
| 2001/0005423 A1 | 6/2001 | Rhoads |
| 2001/0016503 A1 | 8/2001 | Kang |
| 2001/0020220 A1 | 9/2001 | Kurosawa |
| 2002/0044082 A1 | 4/2002 | Woodington et al. |
| 2002/0070889 A1 | 6/2002 | Griffin et al. |
| 2002/0072331 A1 | 6/2002 | Fischer et al. |
| 2002/0097184 A1 | 7/2002 | Mayersak |
| 2002/0119754 A1 | 8/2002 | Wakutsu et al. |
| 2002/0161775 A1 | 10/2002 | Lasensky et al. |
| 2002/0173341 A1 | 11/2002 | Abdelmonem et al. |
| 2003/0013454 A1 | 1/2003 | Hunzinger |
| 2003/0040277 A1 | 2/2003 | Deats |
| 2003/0083091 A1 | 5/2003 | Nuutinen et al. |
| 2003/0087648 A1 | 5/2003 | Mezhvinsky et al. |
| 2003/0104831 A1 | 6/2003 | Razavilar et al. |
| 2003/0144601 A1 | 7/2003 | Prichep |
| 2003/0145008 A1 | 7/2003 | Burrell |
| 2003/0145328 A1 | 7/2003 | Rabinowitz et al. |
| 2003/0198304 A1 | 10/2003 | Sugar et al. |
| 2003/0206640 A1 | 11/2003 | Malvar et al. |
| 2003/0224801 A1 | 12/2003 | Lovberg et al. |
| 2003/0232612 A1 | 12/2003 | Richards et al. |
| 2004/0001688 A1 | 1/2004 | Shen |
| 2004/0023674 A1 | 2/2004 | Miller |
| 2004/0127214 A1 | 7/2004 | Reddy et al. |
| 2004/0137915 A1 | 7/2004 | Diener et al. |
| 2004/0147254 A1 | 7/2004 | Reddy et al. |
| 2004/0171390 A1 | 9/2004 | Chitrapu |
| 2004/0203725 A1 | 10/2004 | Lahav et al. |
| 2004/0203826 A1 | 10/2004 | Sugar et al. |
| 2004/0208238 A1 | 10/2004 | Thomas et al. |
| 2004/0219885 A1 | 11/2004 | Sugar et al. |
| 2004/0233100 A1 | 11/2004 | Dibble et al. |
| 2005/0003828 A1 | 1/2005 | Sugar et al. |
| 2005/0096026 A1 | 5/2005 | Chitrapu et al. |
| 2005/0107102 A1 | 5/2005 | Yoon et al. |
| 2005/0114023 A1 | 5/2005 | Williamson et al. |
| 2005/0152317 A1 | 7/2005 | Awater et al. |
| 2005/0159928 A1 | 7/2005 | Moser |
| 2005/0176401 A1 | 8/2005 | Nanda et al. |
| 2005/0185618 A1 | 8/2005 | Friday et al. |
| 2005/0192727 A1 | 9/2005 | Shostak et al. |
| 2005/0227625 A1 | 10/2005 | Diener |
| 2005/0285792 A1 | 12/2005 | Sugar et al. |
| 2006/0025118 A1 | 2/2006 | Chitrapu et al. |
| 2006/0047704 A1 | 3/2006 | Gopalakrishnan |
| 2006/0074558 A1 | 4/2006 | Williamson et al. |
| 2006/0080040 A1 | 4/2006 | Garczarek et al. |
| 2006/0111899 A1 | 5/2006 | Padhi et al. |
| 2006/0128311 A1 | 6/2006 | Tesfai |
| 2006/0133263 A1 | 6/2006 | Bernard et al. |
| 2006/0199546 A1 | 9/2006 | Durgin |
| 2006/0235574 A1 | 10/2006 | Lapinski et al. |
| 2006/0238417 A1 | 10/2006 | Jendbro et al. |
| 2006/0258347 A1 | 11/2006 | Chitrapu |
| 2007/0016412 A1 | 1/2007 | Mehrotra et al. |
| 2007/0041481 A1 | 2/2007 | Malkemes et al. |
| 2007/0049823 A1 | 3/2007 | Li |
| 2007/0076657 A1 | 4/2007 | Woodings et al. |
| 2007/0098089 A1 | 5/2007 | Li et al. |
| 2007/0111746 A1 | 5/2007 | Anderson |
| 2007/0149216 A1 | 6/2007 | Misikangas |

(56) References Cited

U.S. PATENT DOCUMENTS

| | | |
|---|---|---|
| 2007/0168580 A1 | 7/2007 | Schumacher |
| 2007/0171889 A1 | 7/2007 | Kwon et al. |
| 2007/0203645 A1 | 8/2007 | Dees et al. |
| 2007/0223419 A1 | 9/2007 | Ji et al. |
| 2007/0233336 A1 | 10/2007 | Serguei et al. |
| 2007/0233409 A1 | 10/2007 | Boyan et al. |
| 2007/0273581 A1 | 11/2007 | Garrison et al. |
| 2007/0293171 A1 | 12/2007 | Li et al. |
| 2007/0296591 A1 | 12/2007 | Frederick et al. |
| 2007/0297541 A1 | 12/2007 | Mcgehee |
| 2008/0001735 A1 | 1/2008 | Tran |
| 2008/0010040 A1 | 1/2008 | Mcgehee |
| 2008/0090563 A1 | 4/2008 | Chitrapu |
| 2008/0113634 A1 | 5/2008 | Gates et al. |
| 2008/0123731 A1 | 5/2008 | Wegener |
| 2008/0129367 A1 | 6/2008 | Murata et al. |
| 2008/0130519 A1 | 6/2008 | Bahl et al. |
| 2008/0133190 A1 | 6/2008 | Peretz et al. |
| 2008/0180325 A1 | 7/2008 | Chung et al. |
| 2008/0186235 A1 | 8/2008 | Struckman et al. |
| 2008/0195584 A1 | 8/2008 | Nath et al. |
| 2008/0209117 A1 | 8/2008 | Kajigaya |
| 2008/0211481 A1 | 9/2008 | Chen |
| 2008/0214903 A1 | 9/2008 | Orbach |
| 2008/0252516 A1 | 10/2008 | Ho et al. |
| 2008/0261509 A1 | 10/2008 | Sen |
| 2008/0293353 A1 | 11/2008 | Mody et al. |
| 2009/0006103 A1 | 1/2009 | Koishida et al. |
| 2009/0011713 A1 | 1/2009 | Abusubaih et al. |
| 2009/0018422 A1 | 1/2009 | Banet et al. |
| 2009/0021420 A1 | 1/2009 | Sahinoglu |
| 2009/0046003 A1 | 2/2009 | Tung et al. |
| 2009/0046625 A1 | 2/2009 | Diener et al. |
| 2009/0066578 A1 | 3/2009 | Beadle et al. |
| 2009/0086993 A1 | 4/2009 | Kawaguchi et al. |
| 2009/0103094 A1 | 4/2009 | Hilfiker et al. |
| 2009/0111463 A1 | 4/2009 | Simms et al. |
| 2009/0131067 A1 | 5/2009 | Aaron |
| 2009/0135046 A1 | 5/2009 | Steele et al. |
| 2009/0136052 A1 | 5/2009 | Hohlfeld et al. |
| 2009/0143019 A1 | 6/2009 | Shellhammer |
| 2009/0146881 A1 | 6/2009 | Mesecher |
| 2009/0149202 A1 | 6/2009 | Hill et al. |
| 2009/0190511 A1 | 7/2009 | Li et al. |
| 2009/0207950 A1 | 8/2009 | Tsuruta et al. |
| 2009/0224957 A1 | 9/2009 | Chung et al. |
| 2009/0245327 A1 | 10/2009 | Michaels |
| 2009/0278733 A1 | 11/2009 | Haworth |
| 2009/0280748 A1 | 11/2009 | Shan et al. |
| 2009/0282130 A1 | 11/2009 | Antoniou et al. |
| 2009/0285173 A1 | 11/2009 | Koorapaty et al. |
| 2009/0286563 A1 | 11/2009 | Ji et al. |
| 2009/0322510 A1 | 12/2009 | Berger et al. |
| 2010/0020707 A1 | 1/2010 | Woodings |
| 2010/0044122 A1 | 2/2010 | Sleeman et al. |
| 2010/0056200 A1 | 3/2010 | Tolonen |
| 2010/0075704 A1 | 3/2010 | Mchenry et al. |
| 2010/0109936 A1 | 5/2010 | Levy |
| 2010/0142454 A1 | 6/2010 | Chang |
| 2010/0150122 A1 | 6/2010 | Berger et al. |
| 2010/0172443 A1 | 7/2010 | Shim et al. |
| 2010/0173586 A1 | 7/2010 | Mchenry et al. |
| 2010/0176988 A1 | 7/2010 | Maezawa et al. |
| 2010/0177710 A1 | 7/2010 | Gutkin et al. |
| 2010/0220011 A1 | 9/2010 | Heuser |
| 2010/0253512 A1 | 10/2010 | Wagner et al. |
| 2010/0255794 A1 | 10/2010 | Agnew |
| 2010/0255801 A1 | 10/2010 | Gunasekara et al. |
| 2010/0259998 A1 | 10/2010 | Kwon et al. |
| 2010/0279680 A1 | 11/2010 | Reudink |
| 2010/0292930 A1 | 11/2010 | Koster et al. |
| 2010/0306249 A1 | 12/2010 | Hill et al. |
| 2010/0309317 A1 | 12/2010 | Wu et al. |
| 2010/0325621 A1 | 12/2010 | Andrade et al. |
| 2011/0022342 A1 | 1/2011 | Pandharipande et al. |
| 2011/0045781 A1 | 2/2011 | Shellhammer et al. |
| 2011/0053604 A1 | 3/2011 | Kim et al. |
| 2011/0059747 A1 | 3/2011 | Lindoff et al. |
| 2011/0070885 A1 | 3/2011 | Ruuska et al. |
| 2011/0074631 A1 | 3/2011 | Parker |
| 2011/0077017 A1 | 3/2011 | Yu et al. |
| 2011/0087639 A1 | 4/2011 | Gurney |
| 2011/0090939 A1 | 4/2011 | Diener et al. |
| 2011/0096770 A1 | 4/2011 | Henry |
| 2011/0102258 A1 | 5/2011 | Underbrink et al. |
| 2011/0111751 A1 | 5/2011 | Markhovsky et al. |
| 2011/0116484 A1 | 5/2011 | Henry |
| 2011/0117869 A1 | 5/2011 | Woodings |
| 2011/0122855 A1 | 5/2011 | Henry |
| 2011/0129006 A1 | 6/2011 | Jung et al. |
| 2011/0131260 A1 | 6/2011 | Mody |
| 2011/0134878 A1 | 6/2011 | Geiger et al. |
| 2011/0136478 A1 | 6/2011 | Trigui |
| 2011/0151876 A1 | 6/2011 | Ishii et al. |
| 2011/0183621 A1 | 7/2011 | Quan et al. |
| 2011/0183685 A1 | 7/2011 | Burton et al. |
| 2011/0185059 A1 | 7/2011 | Adnani et al. |
| 2011/0188544 A1 | 8/2011 | Ponnuswamy |
| 2011/0235728 A1 | 9/2011 | Karabinis |
| 2011/0237243 A1 | 9/2011 | Guvenc et al. |
| 2011/0241923 A1 | 10/2011 | Chernukhin |
| 2011/0273328 A1 | 11/2011 | Parker |
| 2011/0286555 A1 | 11/2011 | Cho et al. |
| 2011/0286604 A1 | 11/2011 | Matsuo |
| 2011/0287779 A1 | 11/2011 | Harper |
| 2011/0299481 A1 | 12/2011 | Kim et al. |
| 2011/0300849 A1 | 12/2011 | Chan |
| 2011/0319120 A1 | 12/2011 | Chen et al. |
| 2012/0014332 A1 | 1/2012 | Smith et al. |
| 2012/0032854 A1 | 2/2012 | Bull et al. |
| 2012/0039284 A1 | 2/2012 | Barbieri et al. |
| 2012/0040602 A1 | 2/2012 | Charland |
| 2012/0047544 A1 | 2/2012 | Bouchard |
| 2012/0052869 A1 | 3/2012 | Lindoff et al. |
| 2012/0058775 A1 | 3/2012 | Dupray et al. |
| 2012/0063302 A1 | 3/2012 | Damnjanovic et al. |
| 2012/0071188 A1 | 3/2012 | Wang et al. |
| 2012/0072986 A1 | 3/2012 | Livsics et al. |
| 2012/0077510 A1 | 3/2012 | Chen et al. |
| 2012/0078071 A1 | 3/2012 | Bohm et al. |
| 2012/0081248 A1 | 4/2012 | Kennedy et al. |
| 2012/0094681 A1 | 4/2012 | Freda et al. |
| 2012/0100810 A1 | 4/2012 | Oksanen et al. |
| 2012/0105066 A1 | 5/2012 | Marvin et al. |
| 2012/0115522 A1 | 5/2012 | Nama et al. |
| 2012/0115525 A1 | 5/2012 | Kang et al. |
| 2012/0120892 A1 | 5/2012 | Freda et al. |
| 2012/0129522 A1 | 5/2012 | Kim et al. |
| 2012/0140236 A1 | 6/2012 | Babbitt et al. |
| 2012/0142386 A1 | 6/2012 | Mody et al. |
| 2012/0148068 A1 | 6/2012 | Chandra et al. |
| 2012/0148069 A1 | 6/2012 | Bai et al. |
| 2012/0155217 A1 | 6/2012 | Dellinger et al. |
| 2012/0169424 A1 | 7/2012 | Pinarello et al. |
| 2012/0182430 A1 | 7/2012 | Birkett et al. |
| 2012/0195269 A1 | 8/2012 | Kang et al. |
| 2012/0212628 A1 | 8/2012 | Wu et al. |
| 2012/0214511 A1 | 8/2012 | Vartanian et al. |
| 2012/0230214 A1 | 9/2012 | Kozisek et al. |
| 2012/0246392 A1 | 9/2012 | Cheon |
| 2012/0264388 A1 | 10/2012 | Guo et al. |
| 2012/0264445 A1 | 10/2012 | Lee et al. |
| 2012/0275354 A1 | 11/2012 | Villain |
| 2012/0281000 A1 | 11/2012 | Woodings |
| 2012/0282942 A1 | 11/2012 | Uusitalo et al. |
| 2012/0295575 A1 | 11/2012 | Nam |
| 2012/0302190 A1 | 11/2012 | Mchenry |
| 2012/0302263 A1 | 11/2012 | Tinnakornsrisuphap et al. |
| 2012/0309288 A1 | 12/2012 | Lu |
| 2012/0321024 A1 | 12/2012 | Wasiewicz et al. |
| 2012/0322487 A1 | 12/2012 | Stanforth |
| 2013/0005240 A1 | 1/2013 | Novak et al. |
| 2013/0005374 A1 | 1/2013 | Uusitalo et al. |
| 2013/0012134 A1 | 1/2013 | Jin et al. |

(56) References Cited

U.S. PATENT DOCUMENTS

| | | |
|---|---|---|
| 2013/0017794 A1 | 1/2013 | Kloper et al. |
| 2013/0023285 A1 | 1/2013 | Markhovsky et al. |
| 2013/0028111 A1 | 1/2013 | Dain et al. |
| 2013/0035108 A1 | 2/2013 | Joslyn et al. |
| 2013/0035128 A1 | 2/2013 | Chan et al. |
| 2013/0045754 A1 | 2/2013 | Markhovsky et al. |
| 2013/0052939 A1 | 2/2013 | Anniballi et al. |
| 2013/0053054 A1 | 2/2013 | Lovitt et al. |
| 2013/0062334 A1 | 3/2013 | Bilchinsky et al. |
| 2013/0064197 A1 | 3/2013 | Novak et al. |
| 2013/0064328 A1 | 3/2013 | Adnani et al. |
| 2013/0070639 A1 | 3/2013 | Demura et al. |
| 2013/0090071 A1 | 4/2013 | Abraham et al. |
| 2013/0095843 A1 | 4/2013 | Smith et al. |
| 2013/0100154 A1 | 4/2013 | Woodings et al. |
| 2013/0103684 A1 | 4/2013 | Yee et al. |
| 2013/0113659 A1 | 5/2013 | Morgan |
| 2013/0165051 A9 | 6/2013 | Li et al. |
| 2013/0165134 A1 | 6/2013 | Touag et al. |
| 2013/0165170 A1 | 6/2013 | Kang |
| 2013/0183989 A1 | 7/2013 | Hasegawa et al. |
| 2013/0183994 A1 | 7/2013 | Ringstroem et al. |
| 2013/0184022 A1 | 7/2013 | Schmidt |
| 2013/0190003 A1 | 7/2013 | Smith et al. |
| 2013/0190028 A1 | 7/2013 | Wang et al. |
| 2013/0196677 A1 | 8/2013 | Smith et al. |
| 2013/0208587 A1 | 8/2013 | Bala et al. |
| 2013/0210457 A1 | 8/2013 | Kummetz |
| 2013/0210473 A1 | 8/2013 | Weigand |
| 2013/0217406 A1 | 8/2013 | Villardi et al. |
| 2013/0217408 A1 | 8/2013 | Difazio et al. |
| 2013/0217450 A1 | 8/2013 | Kanj et al. |
| 2013/0231121 A1 | 9/2013 | Kwak et al. |
| 2013/0237212 A1 | 9/2013 | Khayrallah et al. |
| 2013/0242792 A1 | 9/2013 | Woodings |
| 2013/0242934 A1 | 9/2013 | Ueda et al. |
| 2013/0260703 A1 | 10/2013 | Actis et al. |
| 2013/0265198 A1 | 10/2013 | Stroud |
| 2013/0272436 A1 | 10/2013 | Makhlouf et al. |
| 2013/0275346 A1 | 10/2013 | Srikanteswara et al. |
| 2013/0279556 A1 | 10/2013 | Seller |
| 2013/0288734 A1 | 10/2013 | Mody et al. |
| 2013/0309975 A1 | 11/2013 | Kpodzo et al. |
| 2013/0315112 A1 | 11/2013 | Gormley et al. |
| 2013/0329690 A1 | 12/2013 | Kim et al. |
| 2013/0331114 A1 | 12/2013 | Gormley et al. |
| 2014/0003547 A1 | 1/2014 | Williams et al. |
| 2014/0015796 A1 | 1/2014 | Philipp |
| 2014/0018683 A1 | 1/2014 | Park et al. |
| 2014/0024405 A1 | 1/2014 | Qiu |
| 2014/0064723 A1 | 3/2014 | Adles et al. |
| 2014/0066060 A1 | 3/2014 | Ngai |
| 2014/0073261 A1 | 3/2014 | Hassan et al. |
| 2014/0086212 A1 | 3/2014 | Kafle et al. |
| 2014/0128032 A1 | 5/2014 | Muthukumar et al. |
| 2014/0139374 A1 | 5/2014 | Wellman et al. |
| 2014/0163309 A1 | 6/2014 | Bernhard et al. |
| 2014/0199993 A1 | 7/2014 | Dhanda et al. |
| 2014/0201367 A1 | 7/2014 | Trummer et al. |
| 2014/0204766 A1 | 7/2014 | Immendorf et al. |
| 2014/0206279 A1 | 7/2014 | Immendorf et al. |
| 2014/0206307 A1 | 7/2014 | Maurer et al. |
| 2014/0206343 A1 | 7/2014 | Immendorf et al. |
| 2014/0207414 A1 | 7/2014 | Bordow |
| 2014/0225590 A1 | 8/2014 | Jacobs |
| 2014/0256268 A1 | 9/2014 | Olgaard |
| 2014/0256370 A9 | 9/2014 | Gautier et al. |
| 2014/0269374 A1 | 9/2014 | Abdelmonem et al. |
| 2014/0269376 A1 | 9/2014 | Garcia et al. |
| 2014/0274103 A1 | 9/2014 | Steer et al. |
| 2014/0287100 A1 | 9/2014 | Libman |
| 2014/0301216 A1 | 10/2014 | Immendorf et al. |
| 2014/0302796 A1 | 10/2014 | Gormley et al. |
| 2014/0335879 A1 | 11/2014 | Immendorf et al. |
| 2014/0340684 A1 | 11/2014 | Edler et al. |
| 2014/0342675 A1 | 11/2014 | Massarella et al. |
| 2014/0348004 A1 | 11/2014 | Ponnuswamy |
| 2014/0362934 A1 | 12/2014 | Kumar |
| 2015/0016429 A1 | 1/2015 | Menon et al. |
| 2015/0023329 A1 | 1/2015 | Jiang et al. |
| 2015/0068296 A1 | 3/2015 | Lanza Di et al. |
| 2015/0072633 A1 | 3/2015 | Massarella et al. |
| 2015/0126181 A1 | 5/2015 | Breuer et al. |
| 2015/0133058 A1 | 5/2015 | Livis et al. |
| 2015/0150753 A1 | 6/2015 | Racette |
| 2015/0156827 A1 | 6/2015 | Ibragimov et al. |
| 2015/0170145 A1 | 6/2015 | Patel et al. |
| 2015/0201385 A1 | 7/2015 | Mercer et al. |
| 2015/0208312 A1 | 7/2015 | Fudaba |
| 2015/0215794 A1 | 7/2015 | Gormley et al. |
| 2015/0215949 A1 | 7/2015 | Gormley et al. |
| 2015/0242384 A1 | 8/2015 | Reiter |
| 2015/0248047 A1 | 9/2015 | Chakraborty |
| 2015/0289254 A1 | 10/2015 | Garcia et al. |
| 2015/0289265 A1 | 10/2015 | Gormley et al. |
| 2015/0296386 A1 | 10/2015 | Menon et al. |
| 2015/0301167 A1 | 10/2015 | Sentelle et al. |
| 2015/0319768 A1 | 11/2015 | Abdelmonem et al. |
| 2015/0373528 A1 | 12/2015 | Iwai |
| 2016/0014713 A1 | 1/2016 | Kennedy et al. |
| 2016/0037550 A1 | 2/2016 | Barabell et al. |
| 2016/0050690 A1 | 2/2016 | Yun et al. |
| 2016/0061583 A1 | 3/2016 | Ryu et al. |
| 2016/0069994 A1 | 3/2016 | Allen et al. |
| 2016/0072597 A1 | 3/2016 | Carbajal |
| 2016/0073318 A1 | 3/2016 | Aguirre |
| 2016/0080955 A1 | 3/2016 | Carbajal |
| 2016/0086621 A1 | 3/2016 | Hearing et al. |
| 2016/0095188 A1 | 3/2016 | Verberkt et al. |
| 2016/0117853 A1 | 4/2016 | Zhong et al. |
| 2016/0124071 A1 | 5/2016 | Baxley et al. |
| 2016/0126988 A1 | 5/2016 | Mester et al. |
| 2016/0127110 A1 | 5/2016 | McMeekin et al. |
| 2016/0127392 A1 | 5/2016 | Baxley et al. |
| 2016/0154406 A1 | 6/2016 | Im et al. |
| 2016/0161578 A1 | 6/2016 | Weissler et al. |
| 2016/0198471 A1 | 7/2016 | Young et al. |
| 2016/0219506 A1 | 7/2016 | Pratt et al. |
| 2016/0219590 A1 | 7/2016 | Khawer et al. |
| 2016/0225240 A1 | 8/2016 | Voddhi et al. |
| 2016/0241910 A1 | 8/2016 | Rowe |
| 2016/0245921 A1 | 8/2016 | Li et al. |
| 2016/0252342 A1 | 9/2016 | Feldmann et al. |
| 2016/0323920 A1 | 11/2016 | Carbajal |
| 2016/0334527 A1 | 11/2016 | Xu et al. |
| 2016/0345135 A1 | 11/2016 | Garcia et al. |
| 2016/0364079 A1 | 12/2016 | Qiu et al. |
| 2016/0366685 A1 | 12/2016 | Gormley et al. |
| 2016/0374088 A1 | 12/2016 | Garcia et al. |
| 2017/0024767 A1 | 1/2017 | Johnson, Jr. et al. |
| 2017/0025996 A1 | 1/2017 | Cheung et al. |
| 2017/0039413 A1 | 2/2017 | Nadler |
| 2017/0048838 A1 | 2/2017 | Chrisikos et al. |
| 2017/0061690 A1 | 3/2017 | Laughlin et al. |
| 2017/0064564 A1 | 3/2017 | Yun et al. |
| 2017/0078792 A1 | 3/2017 | Simons |
| 2017/0079007 A1 | 3/2017 | Carbajal |
| 2017/0094527 A1 | 3/2017 | Shattil et al. |
| 2017/0118049 A1 | 4/2017 | Miao et al. |
| 2017/0134631 A1 | 5/2017 | Zhao et al. |
| 2017/0146462 A1 | 5/2017 | Baker et al. |
| 2017/0148332 A1 | 5/2017 | Ziemba et al. |
| 2017/0148467 A1 | 5/2017 | Franklin et al. |
| 2017/0192089 A1 | 7/2017 | Parker et al. |
| 2017/0208495 A1 | 7/2017 | Kleinbeck et al. |
| 2017/0234979 A1 | 8/2017 | Mathews et al. |
| 2017/0237484 A1 | 8/2017 | Heath et al. |
| 2017/0238201 A1 | 8/2017 | Gormley et al. |
| 2017/0238203 A1 | 8/2017 | Dzierwa et al. |
| 2017/0243138 A1 | 8/2017 | Dzierwa et al. |
| 2017/0243139 A1 | 8/2017 | Dzierwa et al. |
| 2017/0248677 A1 | 8/2017 | Mahmood et al. |
| 2017/0248807 A1 | 8/2017 | Jiang et al. |
| 2017/0250766 A1 | 8/2017 | Dzierwa et al. |

(56) References Cited

U.S. PATENT DOCUMENTS

| | | |
|---|---|---|
| 2017/0253330 A1 | 9/2017 | Saigh et al. |
| 2017/0261604 A1 | 9/2017 | Van Voorst |
| 2017/0261613 A1 | 9/2017 | Van Voorst |
| 2017/0261615 A1 | 9/2017 | Ying et al. |
| 2017/0274992 A1 | 9/2017 | Chretien |
| 2017/0276763 A1 | 9/2017 | Howard |
| 2017/0289840 A1 | 10/2017 | Sung et al. |
| 2017/0290075 A1 | 10/2017 | Carbajal et al. |
| 2017/0303014 A1 | 10/2017 | Ghessassi |
| 2017/0311307 A1 | 10/2017 | Negus et al. |
| 2017/0358103 A1 | 12/2017 | Shao et al. |
| 2017/0366361 A1 | 12/2017 | Afkhami et al. |
| 2017/0374572 A1 | 12/2017 | Kleinbeck et al. |
| 2017/0374573 A1 | 12/2017 | Kleinbeck et al. |
| 2018/0006730 A1 | 1/2018 | Kuo et al. |
| 2018/0014217 A1 | 1/2018 | Kleinbeck et al. |
| 2018/0024220 A1 | 1/2018 | Massarella et al. |
| 2018/0046869 A1 | 2/2018 | Cordell et al. |
| 2018/0070362 A1 | 3/2018 | Ryan et al. |
| 2018/0074170 A1 | 3/2018 | Ray |
| 2018/0074171 A1 | 3/2018 | Ray et al. |
| 2018/0081355 A1 | 3/2018 | Magy et al. |
| 2018/0083721 A1 | 3/2018 | Wada et al. |
| 2018/0098173 A1 | 4/2018 | van Brandenburg et al. |
| 2018/0115065 A1 | 4/2018 | Valdes Garcia et al. |
| 2018/0124533 A1 | 5/2018 | Messier et al. |
| 2018/0129881 A1 | 5/2018 | Seeber et al. |
| 2018/0131445 A1 | 5/2018 | Esman et al. |
| 2018/0143314 A1 | 5/2018 | Pelletier et al. |
| 2018/0149729 A1 | 5/2018 | Grandin et al. |
| 2018/0211179 A1 | 7/2018 | Dzierwa |
| 2018/0284758 A1 | 10/2018 | Cella et al. |
| 2018/0288620 A1 | 10/2018 | Jayawickrama et al. |
| 2018/0288630 A1 | 10/2018 | Guirguis et al. |
| 2018/0294901 A1 | 10/2018 | Garcia et al. |
| 2018/0313877 A1 | 11/2018 | Brant et al. |
| 2018/0313945 A1 | 11/2018 | Parker et al. |
| 2018/0324595 A1 | 11/2018 | Shima |
| 2018/0329020 A1 | 11/2018 | Hafizovic et al. |
| 2018/0331863 A1 | 11/2018 | Carbajal |
| 2019/0004518 A1 | 1/2019 | Zhou et al. |
| 2019/0011534 A1 | 1/2019 | Trotta et al. |
| 2019/0018103 A1 | 1/2019 | Qian et al. |
| 2019/0049943 A1 | 2/2019 | Xue et al. |
| 2019/0064130 A1 | 2/2019 | Kanazawa et al. |
| 2019/0064223 A1 | 2/2019 | Kincaid |
| 2019/0072601 A1 | 3/2019 | Dzierwa et al. |
| 2019/0074802 A1 | 3/2019 | Geha et al. |
| 2019/0077507 A1 | 3/2019 | Ferris et al. |
| 2019/0123428 A1 | 4/2019 | Packer et al. |
| 2019/0180630 A1 | 6/2019 | Kleinbeck |
| 2019/0190553 A1 | 6/2019 | Tsuji et al. |
| 2019/0191313 A1 | 6/2019 | Dzierwa et al. |
| 2019/0200303 A1 | 6/2019 | Nakahara |
| 2019/0208112 A1 | 7/2019 | Kleinbeck |
| 2019/0208491 A1 | 7/2019 | Dzierwa et al. |
| 2019/0215709 A1 | 7/2019 | Kleinbeck et al. |
| 2019/0223139 A1 | 7/2019 | Kleinbeck et al. |
| 2019/0230539 A1 | 7/2019 | Dzierwa et al. |
| 2019/0230540 A1 | 7/2019 | Carbajal et al. |
| 2019/0236266 A1 | 8/2019 | Nashimoto et al. |
| 2019/0245722 A1 | 8/2019 | Carbajal |
| 2019/0246304 A1 | 8/2019 | Dzierwa et al. |
| 2019/0253160 A1 | 8/2019 | Garcia et al. |
| 2019/0253905 A1 | 8/2019 | Kleinbeck et al. |
| 2019/0260768 A1 | 8/2019 | Mestha et al. |
| 2019/0274059 A1 | 9/2019 | Kleinbeck et al. |
| 2019/0296910 A1 | 9/2019 | Cheung |
| 2019/0302249 A1 | 10/2019 | High et al. |
| 2019/0302275 A1 | 10/2019 | Tao et al. |
| 2019/0342202 A1 | 11/2019 | Ryan et al. |
| 2019/0346571 A1 | 11/2019 | Furumoto |
| 2019/0360783 A1 | 11/2019 | Whittaker |
| 2019/0364433 A1 | 11/2019 | Das |
| 2019/0364533 A1 | 11/2019 | Kleinbeck et al. |
| 2020/0034620 A1 | 1/2020 | Lutterodt |
| 2020/0036459 A1 | 1/2020 | Menon |
| 2020/0036487 A1 | 1/2020 | Hammond et al. |
| 2020/0043346 A1 | 2/2020 | Vacek |
| 2020/0059800 A1 | 2/2020 | Menon et al. |
| 2020/0066132 A1 | 2/2020 | Kleinbeck |
| 2020/0067752 A1 | 2/2020 | DelMarco |
| 2020/0068573 A1 | 2/2020 | Drozd et al. |
| 2020/0096548 A1 | 3/2020 | Dzierwa et al. |
| 2020/0107207 A1 | 4/2020 | Kleinbeck et al. |
| 2020/0120266 A1 | 4/2020 | Kleinbeck |
| 2020/0128418 A1 | 4/2020 | Dzierwa et al. |
| 2020/0137583 A1 | 4/2020 | Economy et al. |
| 2020/0142029 A1 | 5/2020 | Brooker et al. |
| 2020/0145032 A1 | 5/2020 | Ayala et al. |
| 2020/0162890 A1 | 5/2020 | Spencer et al. |
| 2020/0167196 A1 | 5/2020 | Smith et al. |
| 2020/0169892 A1 | 5/2020 | Dzierwa et al. |
| 2020/0184832 A1 | 6/2020 | Kleinbeck |
| 2020/0196269 A1 | 6/2020 | Dzierwa et al. |
| 2020/0196270 A1 | 6/2020 | Kleinbeck et al. |
| 2020/0242603 A1 | 7/2020 | Salkintzis |
| 2020/0245167 A1 | 7/2020 | Kleinbeck et al. |
| 2020/0260306 A1 | 8/2020 | Kleinbeck et al. |
| 2020/0294032 A1 | 9/2020 | Cheng et al. |
| 2020/0295855 A1 | 9/2020 | Kleinbeck et al. |
| 2020/0382961 A1 | 12/2020 | Shattil et al. |
| 2020/0388036 A1 | 12/2020 | Skrede et al. |
| 2021/0014696 A1 | 1/2021 | Brookes |
| 2021/0067974 A1 | 3/2021 | Guo et al. |
| 2021/0082254 A1 | 3/2021 | Givant |
| 2021/0084217 A1 | 3/2021 | Kleinbeck |
| 2021/0211911 A1 | 7/2021 | Kleinbeck et al. |
| 2021/0250795 A1 | 8/2021 | Dzierwa et al. |
| 2021/0255356 A1 | 8/2021 | Vu et al. |
| 2021/0280039 A1 | 9/2021 | Kleinbeck |
| 2021/0281510 A1 | 9/2021 | Brown, Jr. et al. |
| 2021/0306022 A1 | 9/2021 | Fernando et al. |
| 2021/0360423 A1 | 11/2021 | Dzierwa et al. |
| 2021/0360450 A1 | 11/2021 | Kleinbeck et al. |
| 2021/0360453 A1 | 11/2021 | Kleinbeck et al. |
| 2021/0360454 A1 | 11/2021 | Carbajal et al. |
| 2021/0409591 A1 | 12/2021 | Kleinbeck |
| 2022/0030541 A1 | 1/2022 | Dzierwa et al. |
| 2022/0052770 A1 | 2/2022 | Kleinbeck et al. |
| 2022/0128612 A1 | 4/2022 | Dzierwa et al. |
| 2022/0131623 A1 | 4/2022 | Garcia et al. |
| 2022/0150824 A1 | 5/2022 | Kleinbeck et al. |
| 2022/0174525 A1 | 6/2022 | Dzierwa et al. |
| 2022/0253407 A1 | 8/2022 | Tran |
| 2022/0262228 A1 | 8/2022 | Kleinbeck |
| 2022/0262261 A1 | 8/2022 | Kleinbeck |
| 2022/0286997 A1 | 9/2022 | Kleinbeck et al. |
| 2022/0376921 A1 | 11/2022 | Maria |
| 2023/0018133 A1 | 1/2023 | Burnette et al. |
| 2023/0045636 A1 | 2/2023 | Dzierwa et al. |
| 2023/0087729 A1 | 3/2023 | Goldstein et al. |
| 2023/0098387 A1 | 3/2023 | Hafeez et al. |
| 2023/0105718 A1 | 4/2023 | Carbajal |
| 2023/0114804 A1 | 4/2023 | Kleinbeck |
| 2023/0116761 A1 | 4/2023 | Barry et al. |
| 2023/0118723 A1 | 4/2023 | Carbajal et al. |
| 2023/0123375 A1 | 4/2023 | Dzierwa et al. |
| 2023/0126223 A1 | 4/2023 | Kleinbeck et al. |
| 2023/0189010 A1 | 6/2023 | Muhammad et al. |
| 2023/0189382 A1 | 6/2023 | Haustein et al. |
| 2023/0206216 A1 | 6/2023 | Lehmann et al. |
| 2023/0209378 A1 | 6/2023 | Kleinbeck et al. |
| 2023/0232244 A1 | 7/2023 | Dzierwa et al. |
| 2023/0252744 A1 | 8/2023 | Miller et al. |
| 2023/0254054 A1 | 8/2023 | Garcia et al. |
| 2023/0254567 A1 | 8/2023 | Kleinbeck |
| 2023/0254702 A1 | 8/2023 | Damnjanovic et al. |
| 2023/0275791 A1 | 8/2023 | Carbajal |
| 2023/0276280 A1 | 8/2023 | Kleinbeck et al. |
| 2023/0300256 A1 | 9/2023 | Zhao et al. |
| 2023/0308789 A1 | 9/2023 | Tian et al. |
| 2023/0308915 A1 | 9/2023 | Carbajal et al. |
| 2023/0326323 A1 | 10/2023 | Kleinbeck |

(56) References Cited

U.S. PATENT DOCUMENTS

| | | |
|---|---|---|
| 2023/0334472 A1 | 10/2023 | Pene |
| 2023/0345441 A1 | 10/2023 | Baxley |
| 2023/0349962 A1 | 11/2023 | Dzierwa et al. |
| 2023/0378645 A1 | 11/2023 | Tran |
| 2023/0403564 A1 | 12/2023 | Dzierwa et al. |
| 2024/0005409 A1 | 1/2024 | Doney |
| 2024/0007204 A1 | 1/2024 | Kleinbeck et al. |
| 2024/0007479 A1 | 1/2024 | Doney |
| 2024/0023054 A1 | 1/2024 | Dzierwa et al. |
| 2024/0029572 A1 | 1/2024 | Kleinbeck |
| 2024/0031042 A1 | 1/2024 | Garcia et al. |
| 2024/0032084 A1 | 1/2024 | Hellwig |
| 2024/0089130 A1 | 3/2024 | Wang et al. |
| 2024/0097951 A1 | 3/2024 | Carbajal |
| 2024/0103059 A1 | 3/2024 | Dzierwa et al. |
| 2024/0114370 A1 | 4/2024 | Kleinbeck et al. |
| 2024/0160791 A1 | 5/2024 | He et al. |
| 2024/0241163 A1 | 7/2024 | Dzierwa et al. |
| 2024/0242589 A1 | 7/2024 | Kleinbeck |
| 2024/0244461 A1 | 7/2024 | Kleinbeck et al. |
| 2024/0267268 A1 | 8/2024 | Carbajal |
| 2024/0267769 A1 | 8/2024 | Dzierwa et al. |
| 2024/0275504 A1 | 8/2024 | Kleinbeck et al. |
| 2024/0276261 A1 | 8/2024 | Kleinbeck et al. |
| 2024/0276262 A1 | 8/2024 | Kleinbeck et al. |
| 2024/0284214 A1 | 8/2024 | Kleinbeck et al. |
| 2024/0292248 A1 | 8/2024 | Kleinbeck et al. |
| 2024/0306019 A1 | 9/2024 | Murias et al. |
| 2024/0330927 A1 | 10/2024 | Abdelrahman et al. |
| 2024/0362631 A1 | 10/2024 | Agrawal et al. |
| 2024/0373463 A1 | 11/2024 | Furuichi et al. |
| 2024/0378982 A1 | 11/2024 | Kleinbeck |
| 2024/0381106 A1 | 11/2024 | Montalvo et al. |
| 2024/0386800 A1 | 11/2024 | Kleinbeck et al. |
| 2024/0386801 A1 | 11/2024 | Kleinbeck et al. |
| 2024/0388935 A1 | 11/2024 | Carbajal et al. |
| 2024/0388937 A1 | 11/2024 | Murias et al. |
| 2024/0396648 A1 | 11/2024 | Kleinbeck et al. |
| 2024/0430142 A1 | 12/2024 | Carbajal |
| 2025/0007629 A1 | 1/2025 | Dzierwa et al. |
| 2025/0039711 A1 | 1/2025 | Dzierwa et al. |
| 2025/0063405 A1 | 2/2025 | Carbajal et al. |
| 2025/0071584 A1 | 2/2025 | Kleinbeck et al. |
| 2025/0150841 A1 | 5/2025 | Murias et al. |
| 2025/0202602 A1 | 6/2025 | Dzierwa et al. |

FOREIGN PATENT DOCUMENTS

| | | |
|---|---|---|
| CN | 117196617 A | 12/2023 |
| CN | 117998368 A | 5/2024 |
| GB | 2268857 A | 1/1994 |
| KR | 100248671 B1 | 4/2000 |
| KR | 20140041618 A | 4/2014 |
| SU | 953557 A1 | 8/1982 |
| WO | 2012129932 A1 | 10/2012 |
| WO | 2018184682 A1 | 10/2018 |
| WO | 2023197982 A1 | 10/2023 |
| WO | 2023232010 A1 | 12/2023 |

OTHER PUBLICATIONS

"A Low-Cost, Near-Real-Time Two-LIAS-Based UWB Emitter Monitoring System"; Wang et al.; IEEE A&E Systems Magazine Nov. 2015 (Year: 2015).

"Joint TDOA and FDOA Estimation: A Conditional Bound and Its Use for Optimally Weighted Localization"; Yeredor et al.; IEEE Transactions on Signal Processing, vol. 59, No. 4, Apr. 2011 (Year: 2011).

"Multipath TDOA and FDOA Estimation Using the EM Algorithm"; Belanger; Apr. 27, 1993; 1993 IEEE International Conference on Acoustics, Speech, and Signal Processing (Year: 1993).

"Noise Figure", Wikipedia, located at https://en.wikipedia.org/wiki/Noise_figure (Year: 2022).

"Signal Models for TDOA/FDOA Estimation"; Fowler et al.; IEEE Transactions on Aerospace and Electronic Systems vol. 44, No. Oct. 4, 2008 (Year: 2008).

"Specific attenuation model for rain for use in prediction methods", Recommendation ITU-R P.838-3 (Year: 2005).

Bluetooth vs Zigbee-difference between Bluetooth and Zigbee (located at https://www.rfwireless-world.com/Terminology/Bluetooth-vs-zigbee.html) (Year: 2012).

Boll S.F., Suppression of Acoustic Noise in Speech Using Spectral Subtraction, Apr. 1979, IEEE Transactions on Acoustics, Speech, and Signal Processing, vol. ASSP-27, No. 2, (Year: 1979).

David Eppink and Wolf Kuebler, "TIREM/SEM Handbook", Mar. 1994, IIT Research Institute, p. 1-6, located at http://www.dtic.mil/cgi-bin/GetTRDoc?Location=U2&doc=GetTRDoc.pdf&AD=ADA296913.

English translation of SU-953557-A1 (Year: 2024).

Gabriel Garcia and Daniel Carbajal, U.S. Appl. No. 61/789,758, Provisional Patent Application, filed Mar. 15, 2013 (Specification, Claims, and Drawings).

Gary L. Sugar, System and method for locating wireless devices in an unsynchronized wireless network, U.S. Appl. No. 60/319,737, Provisional Patent Application filed on Nov. 27, 2002, Specification including the claims, abstract, and drawings.

IEEE 100 The Authoritative Dictionary of IEEE Standards Terms. Seventh Edition. Published by Standards Information Network IEEE Press. p. 6 (Year: 2000).

International Search Report and Written Opinion dated Jun. 21, 2018 issued by the International Application Division, Korean Intellectual Property Office as International Searching Authority in connection with International Application No. PCT/US2018/014504 (21 pages).

Mehmet Ali Aygul, Ahmed Naeem, Huseyin Arslan. "Blind Signal Analysis—Wireless Communication Signals", located at https://doi.org/10.1002/9781119764441.ch12 (Year: 2021).

Mobile Emitter Geolocation and Tracking Using TDOA and FDOA Measurements; Musicki et al.; IEEE Transactions on Signal Processing, vol. 58, No. 3, Mar. 2010 (Year: 2010).

RF and Digital Signal Processing for Software-Defined Radio, Chapter 4—High-Level Requirements and Link Budget Analysis (Year: 2009).

S. Dörner, S. Cammerer, J. Hoydis and S. t. Brink, "Deep Learning Based Communication Over the Air," in IEEE Journal of Selected Topics in Signal Processing, vol. 12, No. 1, pp. 132-143, Feb. 2018, doi: 10.1109/JSTSP.2017.2784180.

Steven W. Smith, The Scientist & Engineer's Guide to Digital Signal Processing, 1999, California Technical Publishing, San Diego, California, 2nd Edition, p. 312 (located at http://www.analog.com/media/en/technical-documentation/dsp-book/dsp_book_ch18.pdf) (Year: 1999).

T. J. O'Shea, K. Karra and T. C. Clancy, "Learning to communicate: Channel auto-encoders, domain specific regularizers, and attention," 2016 IEEE International Symposium on Signal Processing and Information Technology (ISSPIT), Limassol, Cyprus, 2016, pp. 223-228, doi: 10.1109/ISSPIT.2016.7886039.

T. O'Shea and J. Hoydis, "An Introduction to Deep Learning for the Physical Layer," in IEEE Transactions on Cognitive Communications and Networking, vol. 3, No. 4, pp. 563-575, Dec. 2017, doi: 10.1109/TCCN.2017.2758370.

* cited by examiner

UNMANNED VEHICLE RECOGNITION AND THREAT MANAGEMENT

CROSS-REFERENCE TO RELATED APPLICATIONS

This application relates to and claims priority from the following applications. This application is a continuation of U.S. patent application Ser. No. 19/098,376, filed Apr. 2, 2025, which is a continuation of U.S. patent application Ser. No. 18/985,777, filed Dec. 18, 2024, which is a continuation of U.S. patent application Ser. No. 18/789,011, filed Jul. 30, 2024, which is a continuation of U.S. patent application Ser. No. 18/785,936, filed Jul. 26, 2024, which is a continuation-in-part of U.S. patent application Ser. No. 18/775,710, filed Jul. 17, 2024, which is a continuation-in-part of U.S. patent application Ser. No. 18/428,606, filed Jan. 31, 2024, which is a continuation of U.S. patent application Ser. No. 18/374,376, filed Sep. 28, 2023, which is a continuation of U.S. patent application Ser. No. 18/142,904, filed May 3, 2023, which is a continuation of U.S. patent application Ser. No. 17/991,348, filed Nov. 21, 2022, which is a continuation of U.S. patent application Ser. No. 17/735,615, filed May 3, 2022, which is a continuation of U.S. patent application Ser. No. 17/190,048 filed Mar. 2, 2021, which is a continuation of U.S. patent application Ser. No. 16/732,811 filed Jan. 2, 2020, which is a continuation of U.S. patent application Ser. No. 16/275,575 filed Feb. 14, 2019, which claims the benefit of U.S. Provisional Application 62/632,276 filed Feb. 19, 2018. U.S. patent application Ser. No. 16/275,575 also claims priority from and is a continuation-in-part of U.S. patent application Ser. No. 16/274,933 filed Feb. 13, 2019, which is a continuation-in-part of U.S. patent application Ser. No. 16/180,690 filed Nov. 5, 2018, which is a continuation-in-part of U.S. patent application Ser. No. 15/412,982 filed Jan. 23, 2017. U.S. patent application Ser. No. 16/180,690 also claims priority from U.S. Provisional Patent Application No. 62/722,420 filed Aug. 24, 2018. U.S. patent application Ser. No. 16/274,933 also claims the benefit of U.S. Provisional Application 62/632,276 filed Feb. 19, 2018. Each of the above-mentioned applications is incorporated herein by reference in its entirety.

BACKGROUND OF THE INVENTION

1. Field of the Invention

The present invention relates to systems and methods for unmanned vehicle recognition and threat management. More particularly, the systems and methods of the present invention are directed to unmanned vehicle detection, classification and direction finding.

2. Description of the Prior Art

Unmanned Aerial Vehicles (UAVs), commonly known as drones, have become readily available in commercial and retail stores. Detailed schematics for their control systems are available from many manufacturers and the internet along with Software Development Kits (SDKs). Rapid modifications are enabled by advancements in various technologies (e.g., 3D printing). UAVs can be modified to deploy dangerous actions and threaten societal securities. For example, UAVs can be modified to deliver dangerous payloads. It is no longer a question of if, it is now a question of when. Thus, it is imperative that organizations and governments take steps to protect critical assets (e.g., ports, power plants), structures (e.g., buildings, stadiums), and personnel and their citizens.

Exemplary U.S. Patent Documents relevant to the prior art include:

U.S. Pat. No. 9,862,489 for "Method and apparatus for drone detection and disablement" by inventors Lee Weinstein et al., filed Feb. 7, 2016 and issued Jan. 9, 2018, describes a method and apparatus for detection and disablement of an unidentified aerial vehicle (UAV) includes arrays of antenna elements receiving in two modalities (for instance radio frequency (RF) and acoustic modalities, or RF and optical modalities). Signal processing of outputs from multiple antenna arrays locates a potential UAV at specific coordinates within a volume of space under surveillance, and automatically aims video surveillance and a short-range projectile launcher at the UAV, and may automatically fire the projectile launcher to down the UAV.

U.S. Pat. No. 9,858,947 for "Drone detection and classification methods and apparatus" by inventors Brian Hearing et al., filed Nov. 24, 2015 and issued Jan. 2, 2018, describes a system, method, and apparatus for drone detection and classification. An example method includes receiving a sound signal in a microphone and recording, via a sound card, a digital sound sample of the sound signal, the digital sound sample having a predetermined duration. The method also includes processing, via a processor, the digital sound sample into a feature frequency spectrum. The method further includes applying, via the processor, broad spectrum matching to compare the feature frequency spectrum to at least one drone sound signature stored in a database, the at least one drone sound signature corresponding to a flight characteristic of a drone model. The method moreover includes, conditioned on matching the feature frequency spectrum to one of the drone sound signatures, transmitting, via the processor, an alert.

U.S. Pat. No. 9,767,699 for "System for and method of detecting drones" by inventors John W. Borghese et al., filed May 14, 2015 and issued Sep. 19, 2017, describes an apparatus and method can provide a warning of a drone or unmanned aerial vehicle in the vicinity of an airport. The apparatus can include at least one antenna directionally disposed at an along the approach or departure path and a detector configured to provide a warning of a presence of sense an unmanned aerial or drone. The warning can be provided in response to a radio frequency signal received by the at least one of the antenna being in a frequency band associated with a transmission frequency for the unmanned aerial vehicle or drone or in a frequency band associated with interaction from receive circuitry of the unmanned aerial vehicle or drone.

U.S. Pat. No. 9,715,009 for "Deterrent for unmanned aerial systems" by inventors Dwaine A. Parker et al., filed Dec. 2, 2016 and issued Jul. 25, 2017, describes a system for providing an integrated multi-sensor detection and countermeasure against commercial unmanned aerial systems/vehicles and includes a detecting element, a tracking element, an identification element, and an interdiction element. The detecting element detects an unmanned aerial vehicle in flight in the region of, or approaching, a property, place, event or very important person. The tracking element determines the exact location of the unmanned aerial vehicle. The identification/classification element utilizing data from the other elements generates the identification and threat assessment of the UAS. The interdiction element, based on automated algorithms can either direct the unmanned aerial vehicle away from the property, place, event or very important person in a non-destructive manner, or can disable the unmanned aerial vehicle in a destructive manner. The interdiction process may be over ridden by intervention by a System Operator/HiL.

U.S. Pat. No. 9,529,360 for "System and method for detecting and defeating a drone" by inventors Howard Melamed et al., filed Apr. 22, 2015 and issued Dec. 27, 2016, describes a system for detecting and defeating a drone. The system has a detection antenna array structured and configured to detect the drone and the drone control signal over a 360 degree field relative to the detection antenna array including detecting the directionality of the drone. The system also includes a neutralization system structured and configured in a communicating relation with the detection antenna array. The neutralization system has a transmission antenna structured to transmit an override signal aimed at the direction of the drone, an amplifier configured to boost the gain of the override signal to exceed the signal strength of the drone control signal, and a processing device configured to create and effect the transmission of the override signal. The patent also discloses a method for detecting and defeating a drone.

U.S. Publication No. 2017/0358103 for "Systems and Methods for Tracking Moving Objects" by inventors Michael Shao et al., filed Jun. 9, 2017 and published Dec. 14, 2017, describes systems and methods for tracking moving objects. The publication discloses an object tracking system comprises a processor, a communications interface, and a memory configured to store an object tracking application. The object tracking application configures the processor to receive a sequence of images; estimate and subtract background pixel values from pixels in a sequence of images; compute sets of summed intensity values for different per frame pixel offsets from a sequence of images; identify summed intensity values from a set of summed intensity values exceeding a threshold; cluster identified summed intensity values exceeding the threshold corresponding to single moving objects; and identify a location of at least one moving object in an image based on at least one summed intensity value cluster.

U.S. Publication No. 2017/0261613 for "Counter drone system" by inventor Brian R. Van Voorst, filed Feb. 27, 2017 and published Sep. 14, 2017, describes a counter drone system that includes a cueing sensor to detect the presence of an object wherein the cueing sensor cues the presence of a target drone, a long range LIDAR system having a sensor pointed in a direction of the target drone to acquire and track at long range the target drone to provide an accurate location of the target drone wherein once a track is acquired, the motion of the target drone is used to maintain the track of the target drone and a threat detector wherein LIDAR data is provided to the threat detector to determine if the target drone is a threat.

U.S. Publication No. 2017/0261604 for "Intercept drone tasked to location of lidar tracked drone" by inventor Brian Van Voorst, filed Feb. 27, 2017 and published Sep. 14, 2017, describes a system that includes a long range LIDAR tracking system to track a target drone and provide detection and tracking information of the target drone; a control system to process the detection and tracking information and provide guidance information to intercept the target drone; and a high powered intercept drone controlled by supervised autonomy, the supervised autonomy provided by processing the detection and tracking information of the target drone and sending guidance information to the intercept drone to direct the intercept drone to the target drone.

U.S. Publication No. 2017/0039413 for "Commercial drone detection" by inventor Gary J. Nadler, filed Aug. 3, 2015 and published Feb. 9, 2017, describes a method of capturing the presence of a drone, including: collecting, using at least one sensor, data associated with an aerial object; analyzing, using a processor, the data to determine at least one characteristic of the aerial object; accessing, in a database, a library of stored characteristics of commercially available drones; determining, based on the analyzing, if the at least one characteristic of the aerial object matches a characteristic of a commercially available drone; and responsive to the determining, generating an indication of a positive match.

U.S. Pat. No. 11,663,992 for Systems and Methods for Detecting, Monitoring, and Mitigating the Presence of Unauthorized Drones by inventors Jordan, et al., Jun. 29, 2020 and published May 23, 2023, is directed to Systems and methods for detecting, monitoring, and mitigating the presence of a drone are provided herein. In one aspect, a system for detecting presence of a drone includes a radio-frequency (RF) receiver. The system can further include a processor and a computer-readable memory in communication with the processor and having stored thereon computer-executable instructions to cause the at least one processor to receive a set of samples from the RF receiver for a time interval, obtain predetermined data of expected communication protocols used between the drone and a controller, and determine whether the RF signal corresponds to one of the expected communication protocols by comparing the samples of the RF signal to the predetermined data and decoding the RF signal. In further aspects the system extracts a unique identifier of the drone based at least partially on the decoded RF signal.

U.S. Pat. No. 11,190,233 for Systems and Methods for Detecting, Monitoring, and Mitigating the Presence of a Drone Using Frequency Hopping by inventors Fang-Hsuan Lo, et al., filed May 28, 2020 and published Nov. 10, 2021, is directed to systems and methods for detecting, monitoring, and mitigating the presence of a drone are provided herein. In one aspect, a system for detecting presence of a one or more drones includes a radio-frequency (RF) receiver configured to receive an RF signal transmitted between a drone and a controller. The system can further include a processor and a computer-readable memory in communication with the processor and having stored thereon computer-executable instructions to cause the at least one processor to receive a set of samples from the RF receiver for a time interval, the set of samples comprising samples of the first RF signal, obtain a parameter model of the first frequency hopping parameters, and fit the parameter model to the set of samples.

U.S. Pat. No. 10,698,076 for Radio Frequency Signal Transmission Detector and Locator by inventors Jones, et al., filed Aug. 2, 2018 and published Jun. 10, 2020, is directed to a system and method for detecting and locating the transmission of radio frequency signals from within a defined geographical area. The system uses statistical confidence limits to detect outliers caused by transmissions in the defined geographical area. The source of the transmission can then be located with triangulation.

U.S. Pat. No. 10,540,905 for Systems, Aircrafts, and Methods for Drone Detection and Collision Avoidance by inventors Bohanan, et al., filed Mar. 28, 2018 and published Jan. 1, 2020, is directed to a system and a method for drone detection and collision avoidance, particularly for use in an aircraft, is provided. The system includes, but is not limited to a sensor, a processor, and an avoidance unit comprising a control unit. The sensor is configured to detect a drone signal in a predetermined space and to transmit the drone signal to the processor. The processor is configured to determine the presence of a drone in the predetermined space based on the drone signal. The processor is configured to transmit a command to the avoidance unit when the processor determines the presence of a drone. The control unit is configured to receive the command and to generate a warning signal in response to receiving the command.

U.S. Pat. No. 9,529,360 for System and Method for Detecting and Defeating a Drone by inventors Melamed. et al., filed Apr. 22, 2015 and published Dec. 7, 2016, is directed to a system for detecting and defeating a drone. The system has a detection antenna array structured and configured to detect the drone and the drone control signal over a 360 degree field relative to the detection antenna array including detecting the directionality of the drone. The system also includes a neutralization system structured and configured in a communicating relation with the detection antenna array. The neutralization system has a transmission antenna structured to transmit an override signal aimed at the direction of the drone, an amplifier configured to boost the gain of the override signal to exceed the signal strength of the drone control signal, and a processing device configured to create and effect the transmission of the override signal. The invention is also directed to a method for detecting and defeating a drone.

SUMMARY OF THE INVENTION

The present invention provides systems and methods for unmanned vehicle recognition. In one embodiment, a multiplicity of receivers captures RF data and transmits the RF data to at least one node device. The at least one node device comprises a signal processing engine, a detection engine, a classification engine, and a direction finding engine. The at least one node device is configured with an artificial intelligence algorithm. The detection engine and classification engine are trained to detect and classify signals from unmanned vehicles and their controllers based on processed data from the signal processing engine. The direction finding engine is operable to provide lines of bearing for detected unmanned vehicles. A display and control unit is in network communication with the at least one node device for displaying locations and other related data for the detected unmanned vehicles.

In one embodiment, the present invention includes a system for signal identification in a radiofrequency (RF) environment, including at least one node device including a processor and at least one memory in communication with at least one RF receiver, wherein the at least one RF receiver is operable to capture RF data in the RF environment and transmit the RF data to the at least one node device, wherein the at least one node device is operable to average Fast Fourier Transform (FFT) data derived from the RF data into at least one tile, wherein the at least one tile is visually represented as at least one waterfall image, wherein the at least one node device is operable to analyze the at least one waterfall image using machine learning (ML) or at least one convolutional neural network (CNN) to identify at least one signal, at least one signal type, and/or noise to create at least one analyzed waterfall image, and wherein the at least one analyzed waterfall image includes a visual indication of the at least one signal, the at least one signal type, and/or the noise.

In another embodiment, the present invention includes an apparatus for signal identification in a radiofrequency (RF) environment, including a node device including a processor and at least one memory, wherein the node device is operable to receive RF data from at least one RF receiver, wherein the node device is operable to average Fast Fourier Transform (FFT) data derived from the RF data into at least one tile, wherein the at least one tile is represented as at least one waterfall image, wherein the node device waterfall image is analyzed using machine learning (ML) or at least one convolutional neural network (CNN) to identify at least one signal, at least one signal type, and/or noise to create at least one analyzed waterfall image, and wherein the at least one analyzed waterfall image includes a visual indication of the at least one signal, the at least one signal type, and/or the noise.

In yet another embodiment, the present invention includes a method for signal identification in a radiofrequency (RF) environment, including at least one RF receiver capturing Fast Fourier Transform (FFT) data in the RF environment and transmitting the FFT data to at least one node device, the at least one node device averaging the FFT data derived from the RF data into at least one tile, wherein the at least one tile is represented as at least one waterfall image, the at least one node device analyzing the at least one waterfall image using machine learning (ML) or at least one convolutional neural network (CNN) to identify at least one signal, at least one signal type, and/or noise, and the at least one node device creating at least one analyzed waterfall image based on the identification of the at least one signal, the at least one signal type, and/or the noise, wherein the at least one analyzed waterfall image includes a visual indication of the at least one signal, the at least one signal type, and/or the noise.

These and other aspects of the present invention will become apparent to those skilled in the art after a reading of the following description of the preferred embodiment when considered with the drawings, as they support the claimed invention.

DETAILED DESCRIPTION

Figure 1:
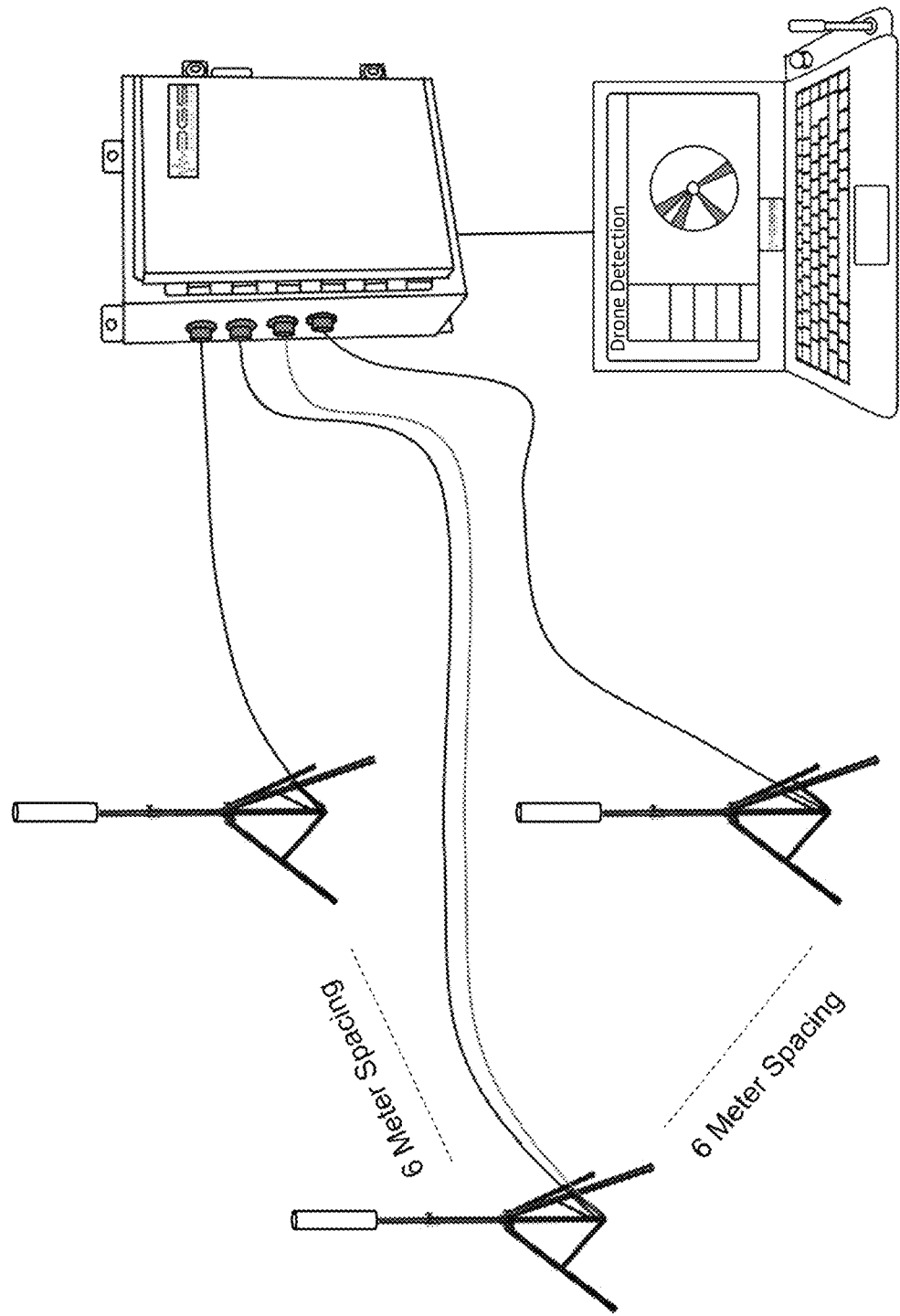
FIG. 1 is a system for unmanned vehicle recognition according to one embodiment of the present invention.

The present invention provides systems and methods for unmanned vehicle recognition. The present invention relates to automatic signal detection, temporal feature extraction, geolocation, and edge processing disclosed in U.S. patent application Ser. No. 15/412,982 filed Jan. 23, 2017, U.S. patent application Ser. No. 15/478,916 filed Apr. 4, 2017, U.S. patent application Ser. No. 15/681,521 filed Aug. 21, 2017, U.S. patent application Ser. No. 15/681,540 filed Aug. 21, 2017, and U.S. patent application Ser. No. 15/681,558 filed Aug. 21, 2017, each of which is incorporated herein by reference in its entirety.

In one embodiment, the present invention includes a system for signal identification in a radiofrequency (RF) environment, including at least one node device including a processor and at least one memory in communication with at least one RF receiver, wherein the at least one RF receiver is operable to capture RF data in the RF environment and transmit the RF data to the at least one node device, wherein the at least one node device is operable to average Fast Fourier Transform (FFT) data derived from the RF data into at least one tile, wherein the at least one tile is visually represented as at least one waterfall image, wherein the at least one node device is operable to analyze the at least one waterfall image using machine learning (ML) or at least one convolutional neural network (CNN) to identify at least one signal, at least one signal type, and/or noise to create at least one analyzed waterfall image, and wherein the at least one analyzed waterfall image includes a visual indication of the at least one signal, the at least one signal type, and/or the noise.

In another embodiment, the present invention includes an apparatus for signal identification in a radiofrequency (RF) environment, including a node device including a processor and at least one memory, wherein the node device is operable to receive RF data from at least one RF receiver, wherein the node device is operable to average Fast Fourier Transform (FFT) data derived from the RF data into at least one tile, wherein the at least one tile is represented as at least one waterfall image, wherein the node device waterfall image is analyzed using machine learning (ML) or at least one convolutional neural network (CNN) to identify at least one signal, at least one signal type, and/or noise to create at least one analyzed waterfall image, and wherein the at least one analyzed waterfall image includes a visual indication of the at least one signal, the at least one signal type, and/or the noise.

In yet another embodiment, the present invention includes a method for signal identification in a radiofrequency (RF) environment, including at least one RF receiver capturing Fast Fourier Transform (FFT) data in the RF environment and transmitting the FFT data to at least one node device, the at least one node device averaging the FFT data derived from the RF data into at least one tile, wherein the at least one tile is represented as at least one waterfall image, the at least one node device analyzing the at least one waterfall image using machine learning (ML) or at least one convolutional neural network (CNN) to identify at least one signal, at least one signal type, and/or noise, and the at least one node device creating at least one analyzed waterfall image based on the identification of the at least one signal, the at least one signal type, and/or the noise, wherein the at least one analyzed waterfall image includes a visual indication of the at least one signal, the at least one signal type, and/or the noise.

Currently, commercial and retail UAVs dominate frequencies including 433 MHz industrial, scientific, and medical radio band (ISM Band) Region 1, 900 MHz ISM Band Region 1,2,3 (varies by country), 2.4 GHz (channels 1-14), 5 GHz (channels 7-165 most predominant), and 3.6 GHz (channels 131-183). Modulation types used by commercial and retail UAVs include Direct Sequence Spread Spectrum (DSSS), Orthogonal Frequency Division Multiplexing (OFDM), Frequency Hopping Spread Spectrum (FHSS), Fataba Advanced Spread Spectrum Technology (FASST).

Many counter UAV systems in the prior art focus on the 2.4 GHz and 5.8 GHz bands utilizing demodulation and decryption of radio frequency (RF) signals to detect and analyze each signal to determine if it is related to a UAV.

The present invention provides systems and methods for unmanned vehicle recognition including detection, classification and direction finding. Unmanned vehicles comprise aerial, terrestrial or water borne unmanned vehicles. The systems and methods for unmanned vehicle recognition are operable to counter threats from the aerial, terrestrial or water borne unmanned vehicles.

In one embodiment, a multiplicity of receivers captures RF data and transmits the RF data to at least one node device. The at least one node device comprises a signal processing engine, a detection engine, a classification engine, and a direction finding engine. The at least one node device is configured with an artificial intelligence algorithm. The detection engine and classification engine are trained to detect and classify signals from unmanned vehicles and their controllers based on processed data from the signal processing engine. The direction finding engine is operable to provide lines of bearing for detected unmanned vehicles. A display and control unit is in network communication with the at least one node device for displaying locations and other related data for the detected unmanned vehicles.

In one embodiment, the present invention provides systems and methods for unmanned vehicle (UV) recognition in a radio frequency (RF) environment. A multiplicity of RF receivers and a displaying device are in network communication with a multiplicity of node devices. The multiplicity of RF receivers is operable to capture the RF data in the RF environment, convert the RF data to fast Fourier transform (FFT) data, and transmit the FFT data to the multiplicity of node devices. The multiplicity of node devices each comprises a signal processing engine, a detection engine, a classification engine, a direction-finding engine, and at least one artificial intelligence (AI) engine. The signal processing engine is operable to average the FFT data into at least one tile. The detection engine is operable to group the FFT data into discrete FFT bins over time, calculate average and standard deviation of power for the discrete FFT bins, and identify at least one signal related to at least one UV and/or corresponding at least one UV controller. The at least one AI engine is operable to generate an output for each of the at least one tile to identify at least one UV and corresponding at least one UV controller with a probability, and calculate an average probability based on the output from each of the at least one tile. The classification engine is operable to classify the at least one UV and/or the at least one UV controller by comparing the at least one signal to classification data stored in a classification library in real time or near real time. The direction-finding engine is operable to calculate a line of bearing for the at least one UV. The displaying device is operable to display a classification of the at least one UV and/or the at least one UV controller and/or the line of bearing of the at least one UV. Each of the at least one tile is visually represented in a waterfall image via a graphical user interface on the displaying device.

FIG. 1 illustrates a system for unmanned vehicle recognition according to one embodiment of the present invention. The system includes a multiplicity of antennas, a receiver and processing unit, and a display and control unit. In one embodiment, there are four multiband omnidirectional antennas. In one embodiment, three multiband omnidirectional antennas are positioned to form an equilateral with 6 meters spacing as illustrated in FIG. 1 as an example. The receiver and processing unit includes a signal processing engine, a UAV detection engine, a UAV classification engine, a direction finding processing engine, and an internal Global Positioning System (GPS). The receiver and processing unit is operable to receive RF data from the antennas and automatically process the RF data for UAV detection and classification and direction finding. The display and control unit includes a human interface display. In one embodiment, the human interface display is provided by a remote web-based interface. The display and control unit is operable to display lines of bearings for detected UAVs and controllers, classification for detected UAVs and controllers, received signal strength (RSS) values, and operating frequencies. In one embodiment, the display and control unit is SigBase 4000 as shown in FIG. 1. In another embodiment, any computer, laptop, or tablet configured with the human interface display of the present invention is operable to function as a display and control unit. In one embodiment, the receiver and processing unit is a node device, and there are multiple node devices communicating with each other and forming a group of networked nodes for UAV detection, classification, and direction finding.

Figure 2:
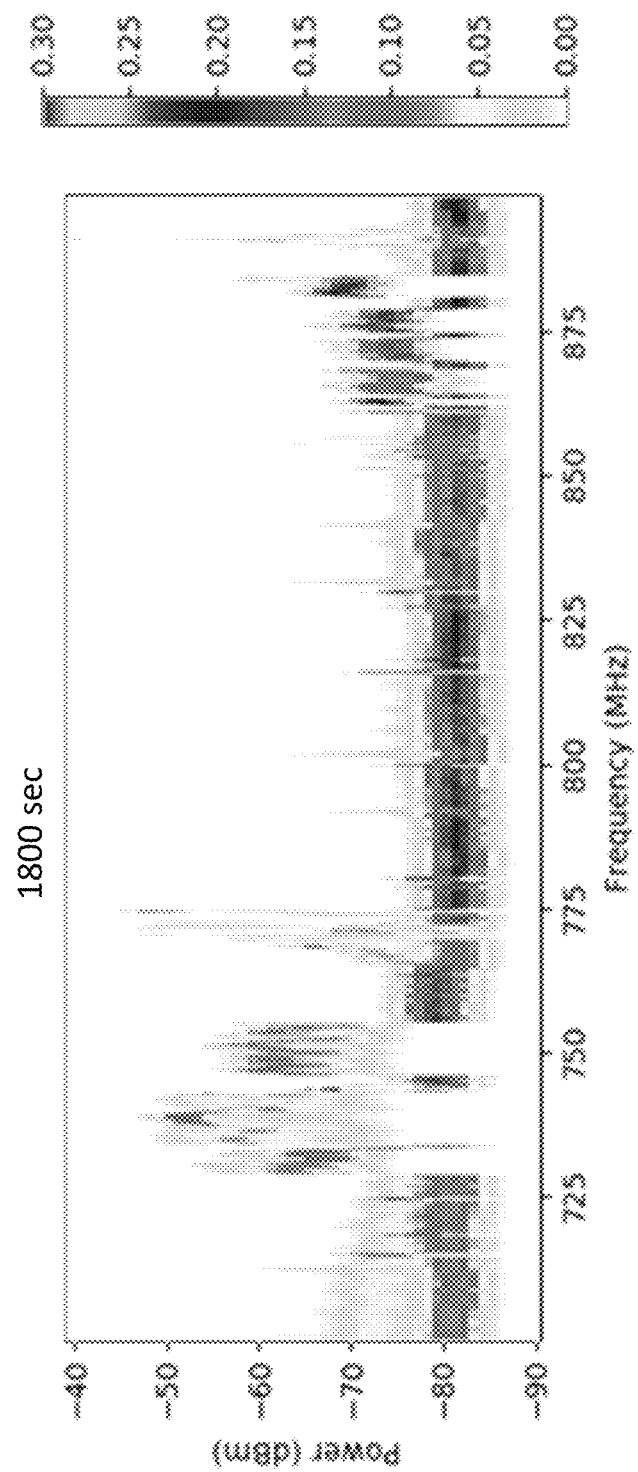
FIG. 2 illustrates signal characterization within a spectrum from 700 MHz to 900 MHz.

The present invention provides a more efficient methodology for UAV detection and identification, which takes advantage of Fast Fourier Transform (FFT) over a short period of time and its derivation. RF data received from antennas are directly converted to FFT data with finer granularity. This allows rapid identification of protocols used by high threat drones without demodulation, and the identification is probability based. An analytics engine is operable to perform near real-time analysis and characterize signals within the spectrum under observation. FIG. 2 illustrates signal characterization within a spectrum from 700 MHz to 900 MHz. Temporal feature extraction is applied for signal characterization, which is described in U.S. patent application Ser. No. 15/412,982 filed Jan. 23, 2017, U.S. patent application Ser. No. 15/681,521 filed Aug. 21, 2017, U.S. patent application Ser. No. 15/681,540 filed Aug. 21, 2017, U.S. patent application Ser. No. 15/681,558 filed Aug. 21, 2017, each of which is incorporated herein by reference in its entirety.

Advantageously, multiple receivers in the present invention work together to ingest spectral activities across large blocks of spectrum. The multiple receivers have an instantaneous bandwidth from 40 MHz to 500 MHz. In one embodiment, the multiple receivers are configurable in 40 MHz and 125 MHz segment building blocks. Input data are converted directly to FFT data and fed into process engines, which significantly decreases latency. The process engines are designed for rapid identification of signals of interest (SOI). When an SOI is detected, a direction finding process is initiated autonomously. In one embodiment, the direction finding process is configurable by an operator.

There are multiple types of communications links utilized for command and control of an unmanned vehicle. Although several cost-effective radio communication (RC) protocols are gaining global popularity, WI-FI is still the most popular protocol for command and control of UAVs and camera systems. A remote controller of a UAV acts as a WI-FI access point and the UAV acts as a client. There are several limiting factors for WI-FI-based UAVs. For example, the operational range of a WI-FI-based UAV is typically limited to 150 feet (46 m) indoor and 300 feet (92 m) outdoor. There is significant latency for control and video behaviors. Interference by other WI-FI devices affects operational continuity of the WI-FI-based UAVs.

Demand in the UAV user community has made more professional-level protocols available in the commercial and retail markets. By way of example but not limitation, two common RC protocols used for UAVs are Lightbridge and OcuSync. Enhancements in drone technology inevitably increases the capability of drones for use in industrial espionage and as weapons for nefarious activities.

Lightbridge is developed for long range and reliable communication. Communication is available within a range up to 5 km. Lightbridge supports 8 selectable channels, and the selection can be manual or automatic. Drones with Lightbridge protocol also have the ability to assess interference and move to alternate channels for greater quality.

OcuSync is developed based on the LightBridge protocol. OcuSync uses effective digital compression and other improvements, which decreases knowledge required to operate. OcuSync provides reliable HD and UHD video, and OcuSync-based drones can be operated in areas with greater dynamic interference. Ocusync improves command and control efficiencies and reduces latency. With OcuSync, video communications are improved substantially, operational range is increased, command and control recovery are enhanced when interference occurs.

The systems and methods of the present invention for unmanned vehicle recognition are operable to detect and classify UAVs at a distance, provide directions of the UAVs, and take defensive measures to mitigate risks. The detection and classification are fast, which provides more time to react and respond to threats. Exact detection range is based upon selection of antenna systems, topology, morphology, and client criteria. Classification of the detected UAVs provides knowledge of the UAVs and defines effective actions and capabilities for countering UAV threats. In one embodiment, the direction information of the UAVs provides orientation within the environment based on the location of the UAV detector.

In one embodiment, the systems and methods of the present invention provides unmanned vehicle recognition solution targeting radio controlled and WI-FI-based drones. The overall system is capable of surveying the spectrum from 20 MHz to 6 GHz, not just the common 2.4 GHz and 5.8 GHz areas as in the prior art. In one embodiment, the systems and methods of the present invention are applied to address 2 major categories: RC-based UAV systems and WI-FI-based UAV systems. In one embodiment, UAV systems utilize RC protocols comprising LightBridge and OcuSync. In another embodiment, UAV systems are WI-FI based, for example but not for limitation, 3DR Solo and Parrot SkyController. The systems and methods of the present invention are operable to detect UAVs and their controllers by protocol.

The systems and methods of the present invention maintain a state-of-the-art learning system and library for classifying detected signals by manufacturer and controller type. The state-of-the-art learning system and library are updated as new protocols emerge.

In one embodiment, classification by protocol chipset is utilized to provide valuable intelligence and knowledge for risk mitigation and threat defense. The valuable intelligence and knowledge include effective operational range, supported peripherals (e.g., external or internal camera, barometers, GPS and dead reckoning capabilities), integrated obstacle avoidance systems, and interference mitigation techniques.

Figure 3:
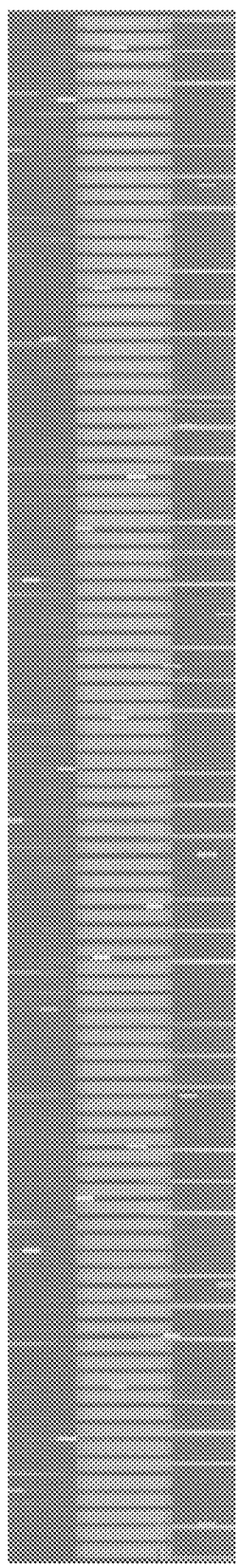
FIG. 3 is an illustration of Phantom 4 controller and drone signals.
Figure 4:
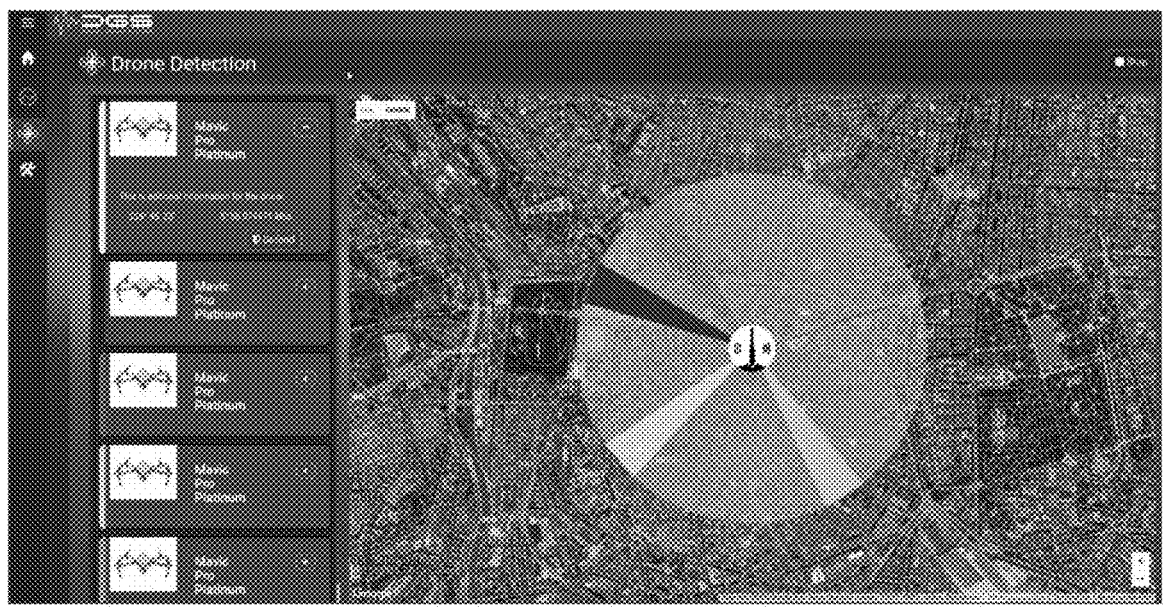
FIG. 4 is a human interface display for drone detection according to one embodiment of the present invention.
Figure 4:
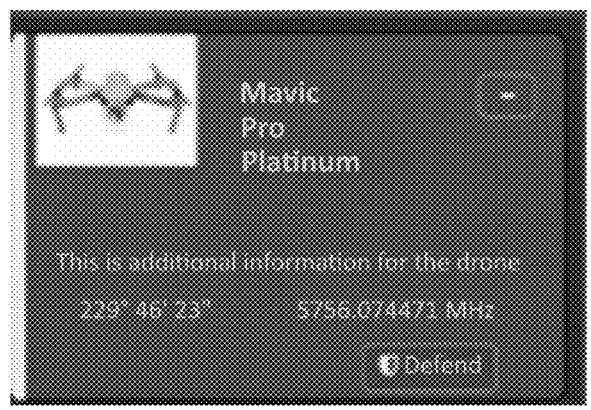

The state-of-the-art learning system of the present invention is highly accurate and capable of assessing detected UAV signals and/or controller signals for classification in less than a few seconds with a high confidence level. The state-of-the-art learning system is operable to discriminate changes in the environment for non-drone signals as well as drone signals. FIG. 3 is an illustration of Phantom 4 controller and drone signals. A human interface is operable to display the classification results. FIG. 4 illustrates a human interface display for drone detection according to one embodiment of the present invention.

It is difficult to recognize commercial and retail drones with the naked eye over 100 meters. It is critical to obtain a vector to the target for situational awareness and defense execution. The systems and methods of the present invention provides lines of bearing for direction finding for multiple UAVs flying simultaneously. Each line of bearing is color coded for display. Angles, along with frequencies utilized for uplink and downlink, are also displayed on the human interface.

Once a UAV is detected and classified, an alert is posted to a counter UAV system operator (e.g., a network operation center, an individual operator) including azimuth of the UAV and other information. The alert is transmitted via email, short message service (SMS) or third-party system integration. The counter UAV system is operable to engage an intercession transmission, which will disrupt the communication between the UAV and its controller. When the communication between the UAV and its controller is intercepted, the UAV will invoke certain safety protocols, such as reduce height and hover, land, or return to the launch point. The counter UAV system may have certain restrictions based on country and classification of the UAV.

In one embodiment, the systems and methods of the present invention are operable to update the UAV library with emerging protocols for classification purposes, and refine the learning engine for wideband spectrum analysis for other potential UAV signatures, emerging protocols and technologies. In other words, the systems and methods of the present invention are adaptable to any new and emerging protocols and technologies developed for unmanned vehicles. In one embodiment, multiple node devices in the present invention are deployed to operate as a group of networked nodes. In one embodiment, the group of networked nodes are operable to estimate geographical locations for unmanned vehicles. In one embodiment, two node devices are operable to provide a single line of bearing and approximate a geographical location of a detected drone or controller. The more node devices there are in the group of network nodes, the more lines of bearing are operable to be provided, and the more accurate the geographical location is estimated for the detected drone or controller. In one embodiment, the geolocation function provides altitude and distance of a targeted drone.

In one embodiment, the counter UAV system in the present invention is operable to alert when unexpected signal characteristics are detected in 2.4 GHz and 5.8 GHz areas and classify the unexpected signal characteristics as potential UAV activities. In another embodiment, the counter UAV system in the present invention is operable to alert when unexpected signal characteristics are detected anywhere from 20 MHz to 6 GHz and classify the unexpected signal characteristics as potential UAV activities. In another embodiment, the counter UAV system in the present invention is operable to classify the unexpected signal characteristics as potential UAV activities when unexpected signal characteristics are detected anywhere from 40 MHz to 6 GHz. The automatic signal detection engine and analytics engine are enhanced in the counter UAV system to recognize potential UAV activities across a great portion of the spectrum. In one embodiment, any blocks of spectrum from 40 MHz to 6 GHz are operable to be selected for UAV recognition.

In one embodiment, vector-based information including inclinations, declinations, topology deviations, and user configurable Northing map orientation is added to the WGS84 mapping system for direction finding and location estimation. In one embodiment, earth-centered earth-fixed vector analysis is provided for multi-node systems to estimate UAV locations, derive UAV velocities from position changes over time, and determine UAV trajectory vectors in fixed nodal processing. In one embodiment, a group of networked node devices are operable to continually provide lines of bearing over time, approximate geographical locations of a detected unmanned vehicle on or above the earth, and track the movement of the detected unmanned vehicle from one estimated location to another. In one embodiment, the group of networked node devices are operable to determine velocities of the detected unmanned vehicle based on estimated locations and travel time. In one embodiment, the group of networked node devices are operable to estimate a trajectory of the detected unmanned vehicle based on the estimated geographical locations over time. In one embodiment, the group of networked node devices are operable to estimate accelerations and decelerations of the unmanned vehicle based on the velocities of the unmanned vehicles over time.

In one embodiment, the systems and methods of the present invention are operable for UAV detection and direction finding for different modulation schemes including but not limited to DSSS, OFDM, FHSS, FASST, etc. In one embodiment, the counter UAV system in the present invention is configured with cameras for motion detection. The cameras have both day and night vision.

Figure 5:
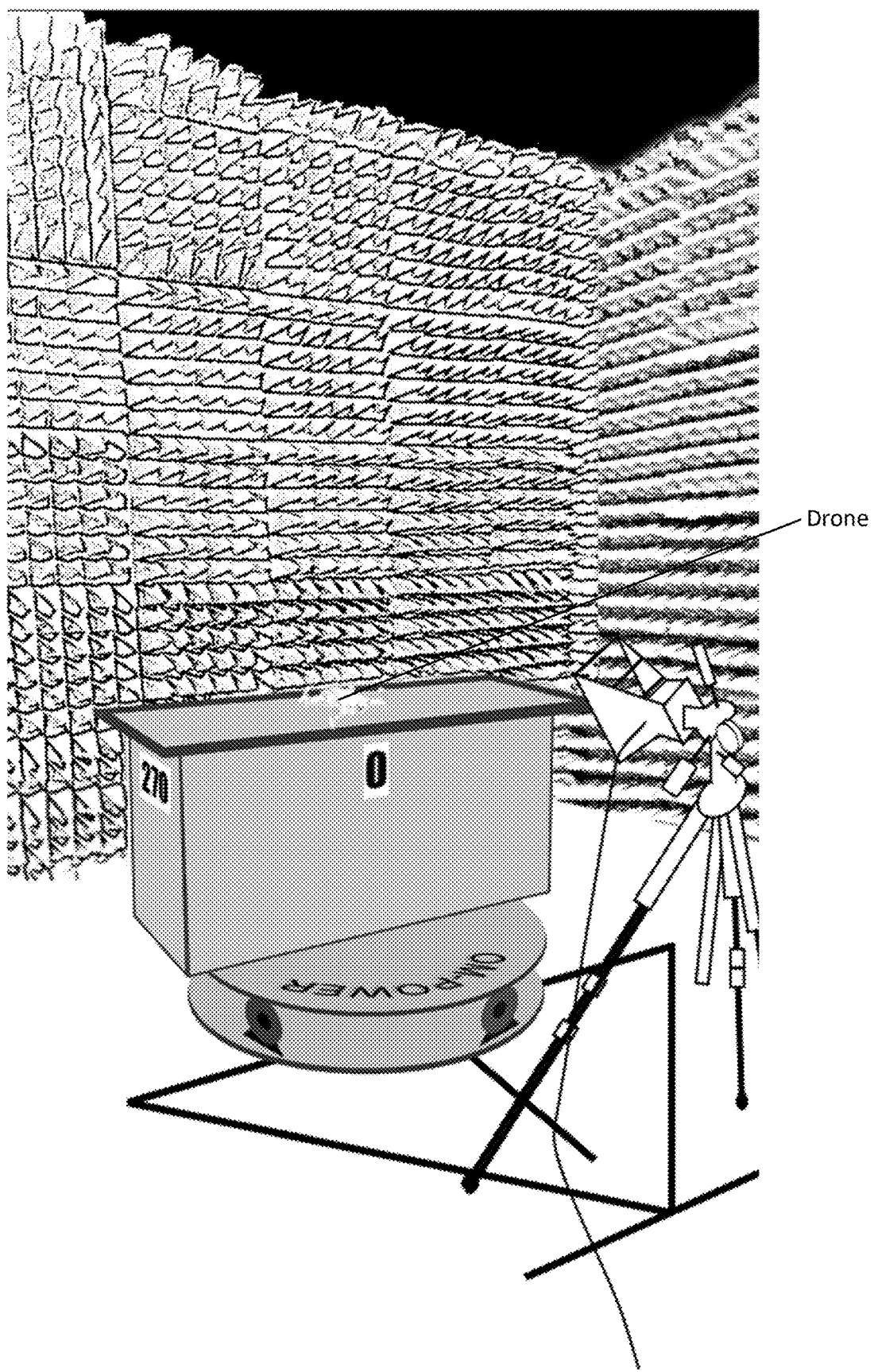
FIG. 5 shows a setup for RF data capture in an Anechoic Chamber according to one embodiment of the present invention.
Figure 6:
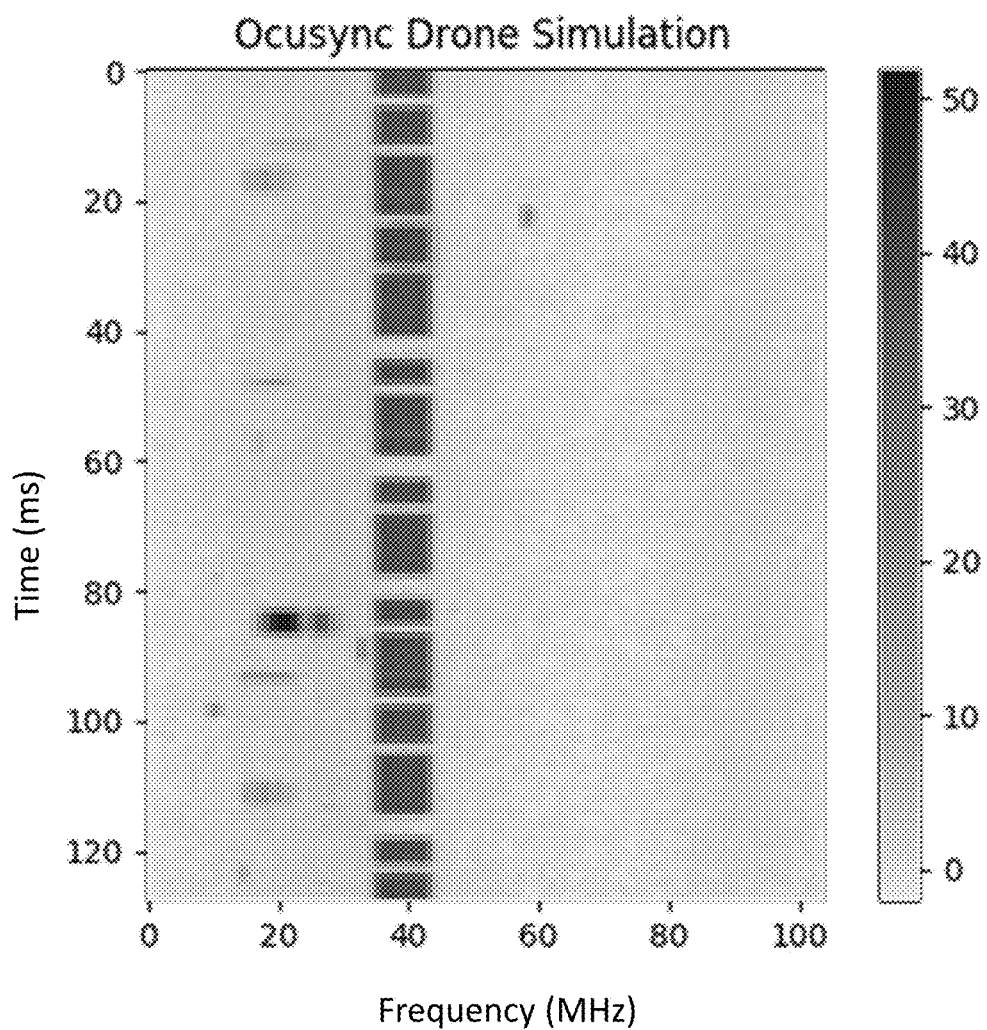
FIG. 6 illustrates a simulation for fading and channel hopping of an OcuSync drone.

In one embodiment, systems and methods of the present invention provides training for unmanned vehicle recognition. RF data is captured for a Phantom 3 drone and its controller and a Phantom 4 drone and its controller, both of which use Lightbridge protocol. RF data is also captured for a Mavic Pro drone and its controller, which uses OcuSync protocol. The RF data is recorded at different channels, different RF bandwidths, and different video quality settings inside and outside an Anechoic Chamber. FIG. 5 shows a setup for RF data capture in an Anechoic Chamber according to one embodiment of the present invention. The recordings are overlaid on the RF environment, and fading and channel hopping are simulated. FIG. 6 illustrates a simulation for fading and channel hopping of an OcuSync drone.

Figure 7:
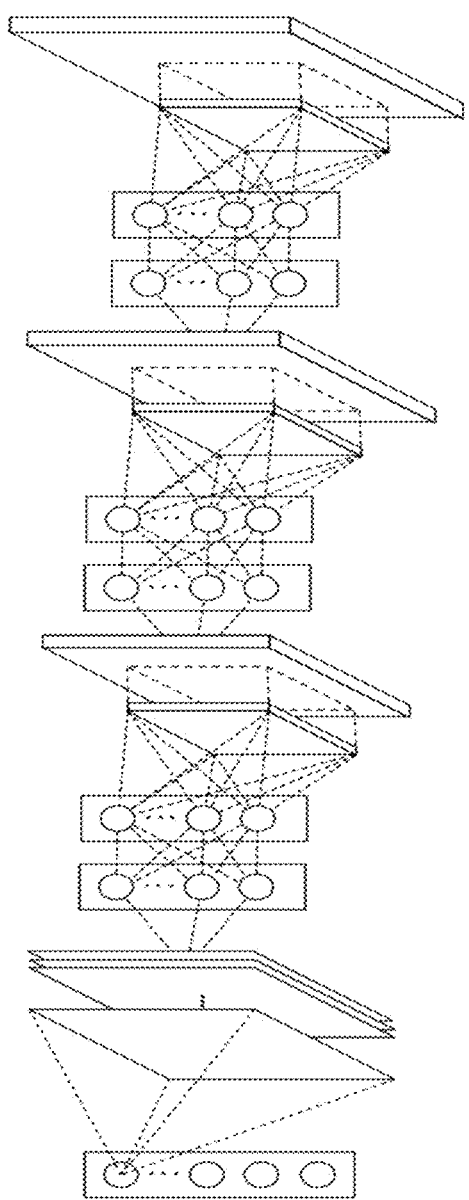
FIG. 7 is an illustration of an inception based convolutional neural network.

In one embodiment, the recorded RF data is used to train and calibrate an inception based convolutional neural network comprised in a drone detection system. FIG. 7 is an illustration of an inception based convolutional neural network. U.S. Patent Publication No. 2018/0137406 titled "Efficient Convolutional Neural Networks and Techniques to Reduce Associated Computational Costs" is incorporated herein by reference in its entirety. The inception based convolutional neural network generates probabilities that drones or their controllers are detected. The detection probabilities are updated multiple times per second.

The trained inception based convolutional neural network is operable to identify Lightbridge 1 controller and drone, Lightbridge 2 controller and drone, and OcuSync controller and drone. The trained inception based convolutional neural network is operable to identify Lightbridge and Ocusync controllers and drones at the same time. In one embodiment, the drone detection system comprising the trained inception based convolutional neural network is operable to search an instantaneous bandwidth of 147.2 MHz.

In one embodiment, the drone detection system of the present invention includes an artificial intelligence (AI) algorithm running on a single board computer (e.g., Nvidia Jetson TX2) with an execution time less than 10 ms. The drone detection system is operable to separate Phantom 3 and Phantom 4 controllers. Waveforms for Phantom 3 and Phantom 4 controllers are sufficiently different to assign separate probabilities.

Figure 8:
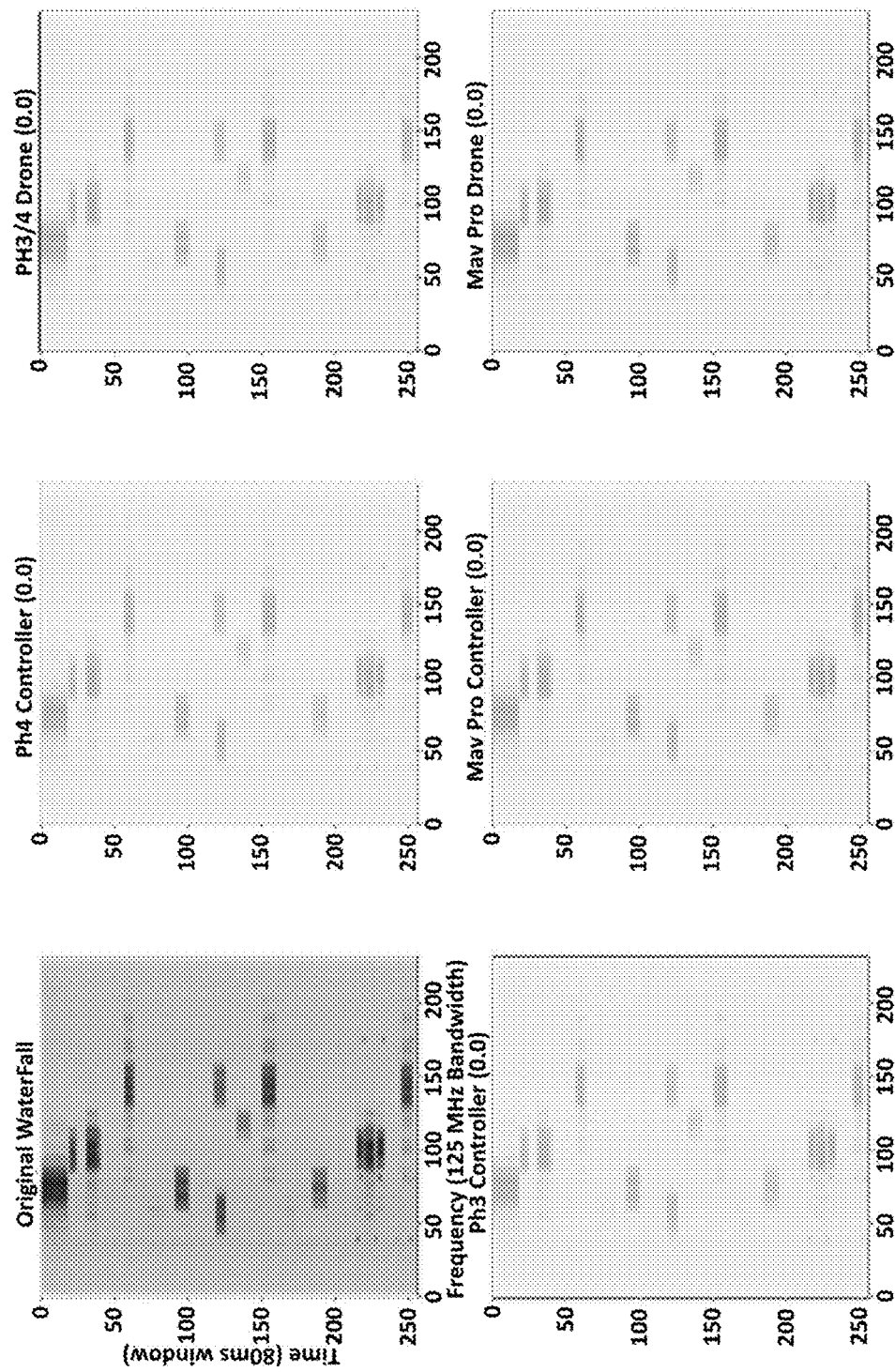
FIG. 8 illustrates a scenario for an RF environment with just noise.
Figure 9:
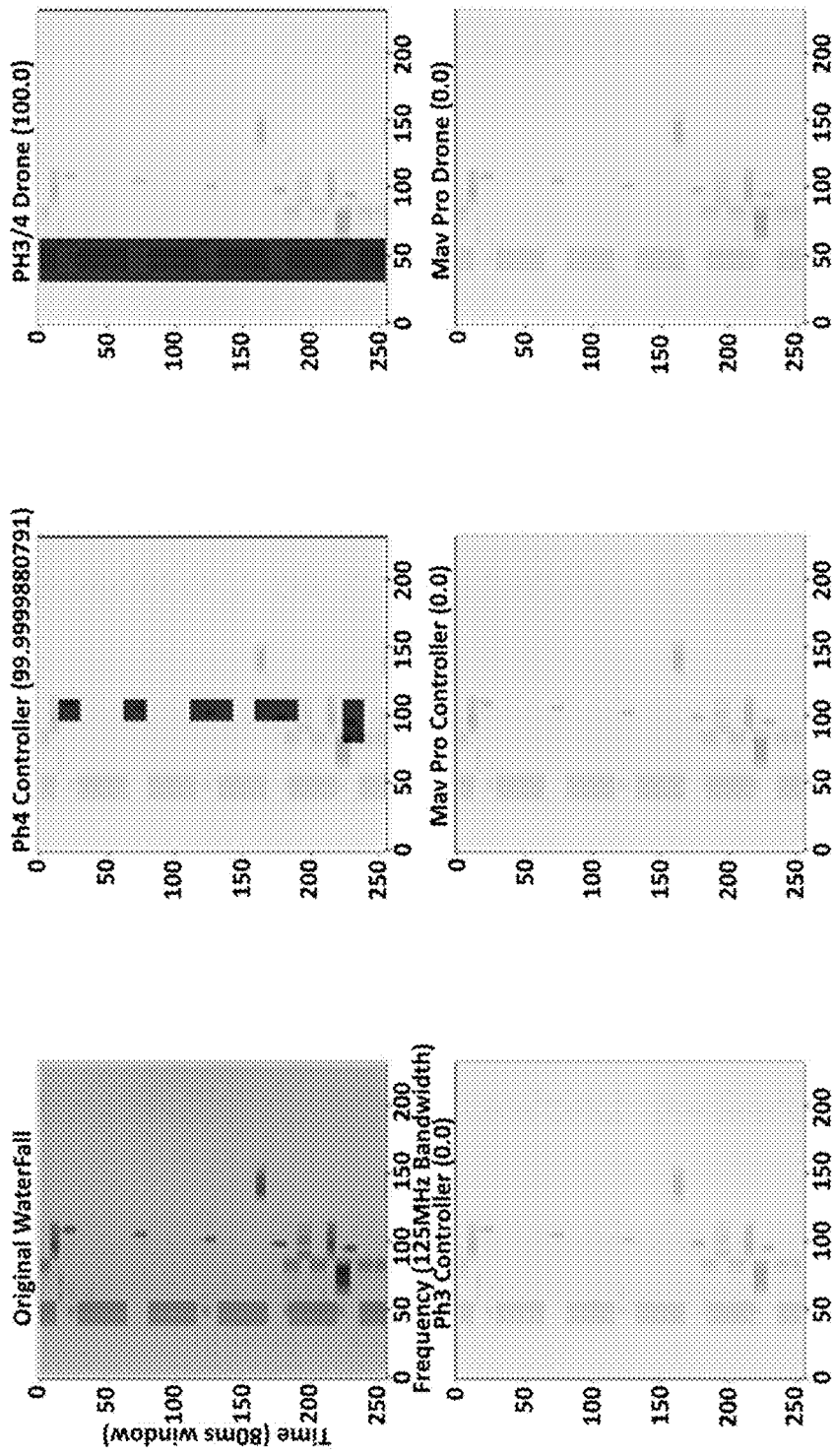
FIG. 9 illustrates a scenario for an RF environment with a Phantom 4 controller and drone.
Figure 10:
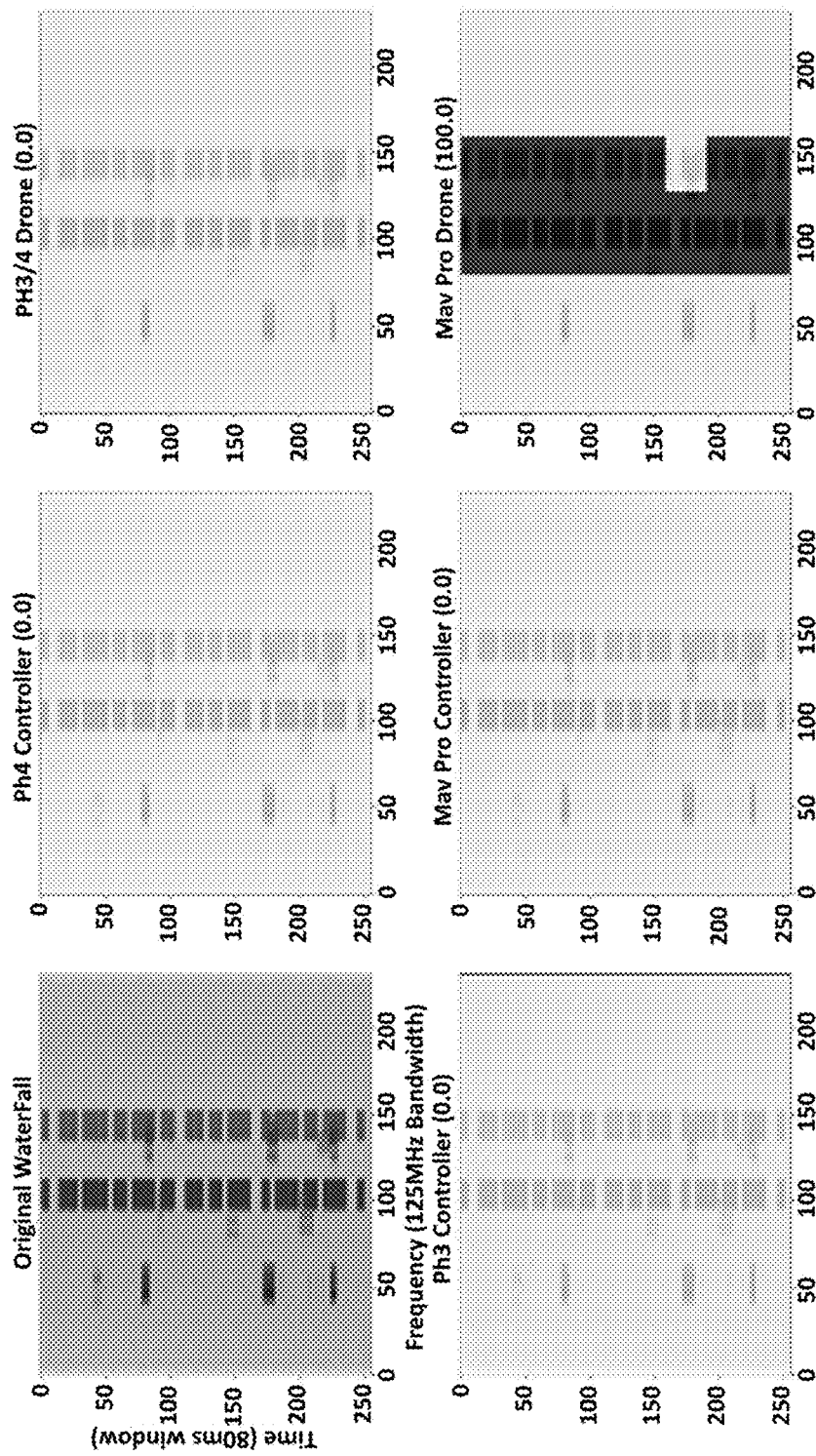
FIG. 10 illustrates a scenario for an RF environment with two Mavic Pro drones.
Figure 11:
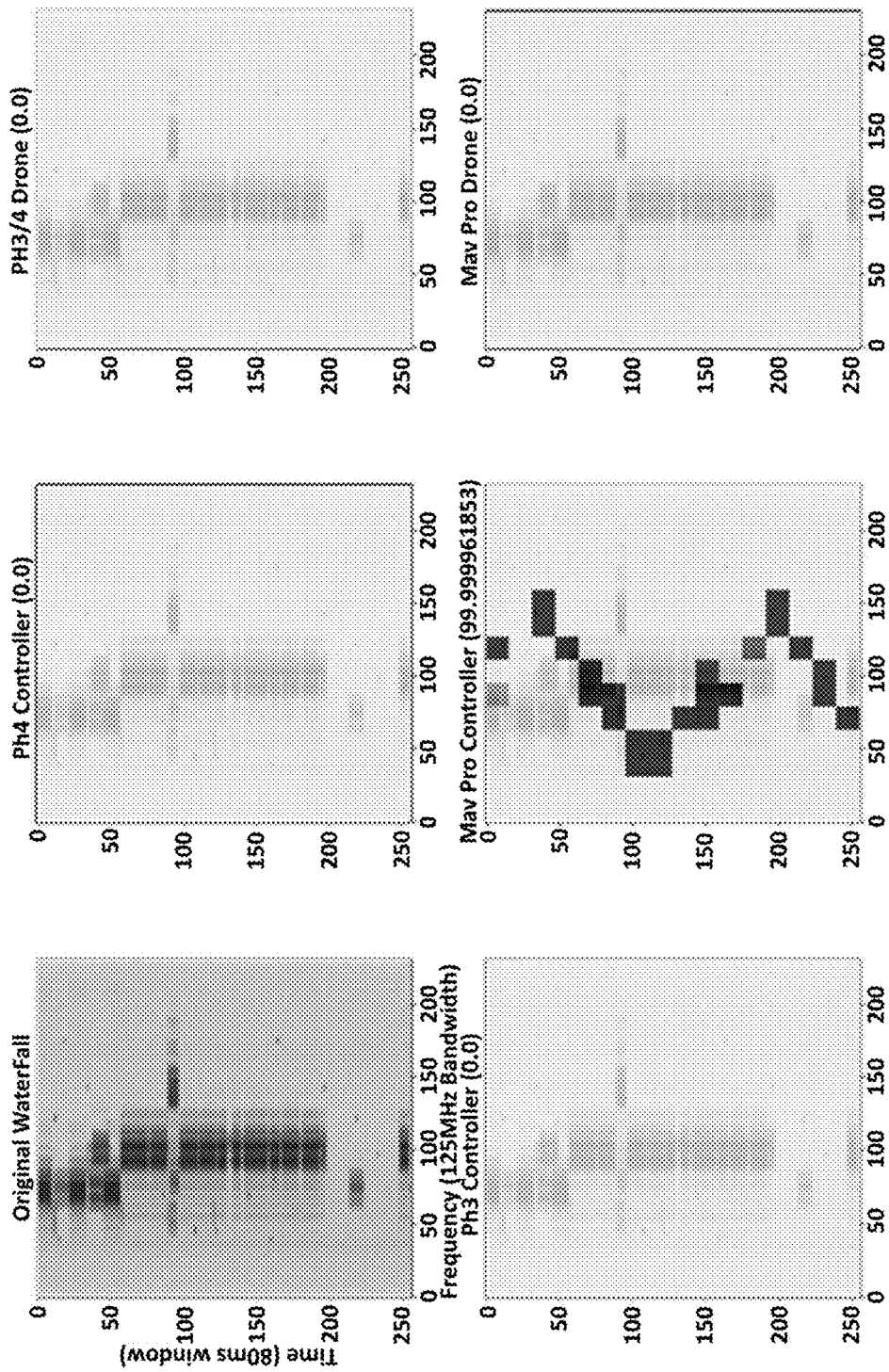
FIG. 11 illustrates a scenario for an RF environment with a Mavic Pro controller only.
Figure 12:
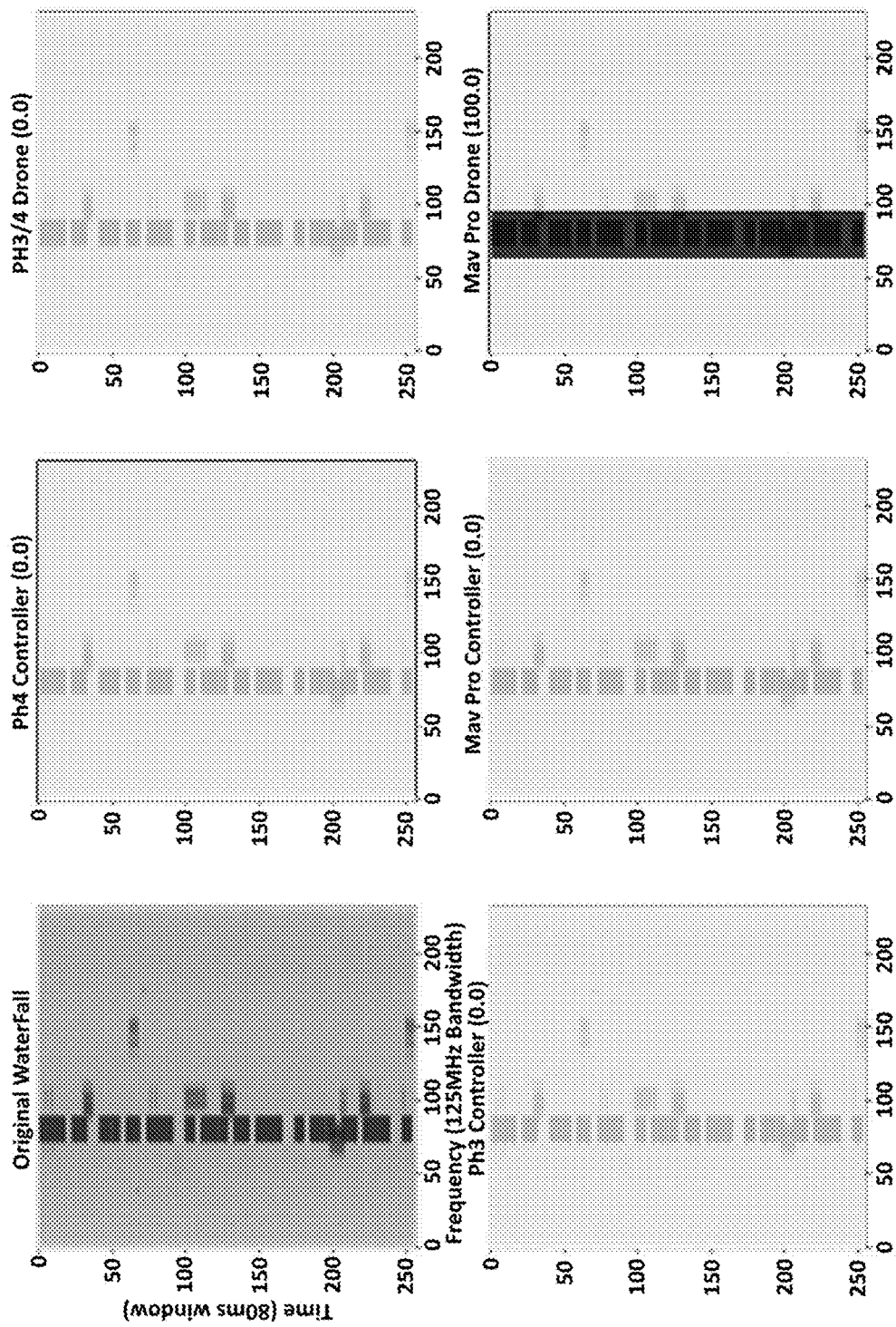
FIG. 12 illustrates a scenario for an RF environment with one Mavic Pro drone only.
Figure 13:
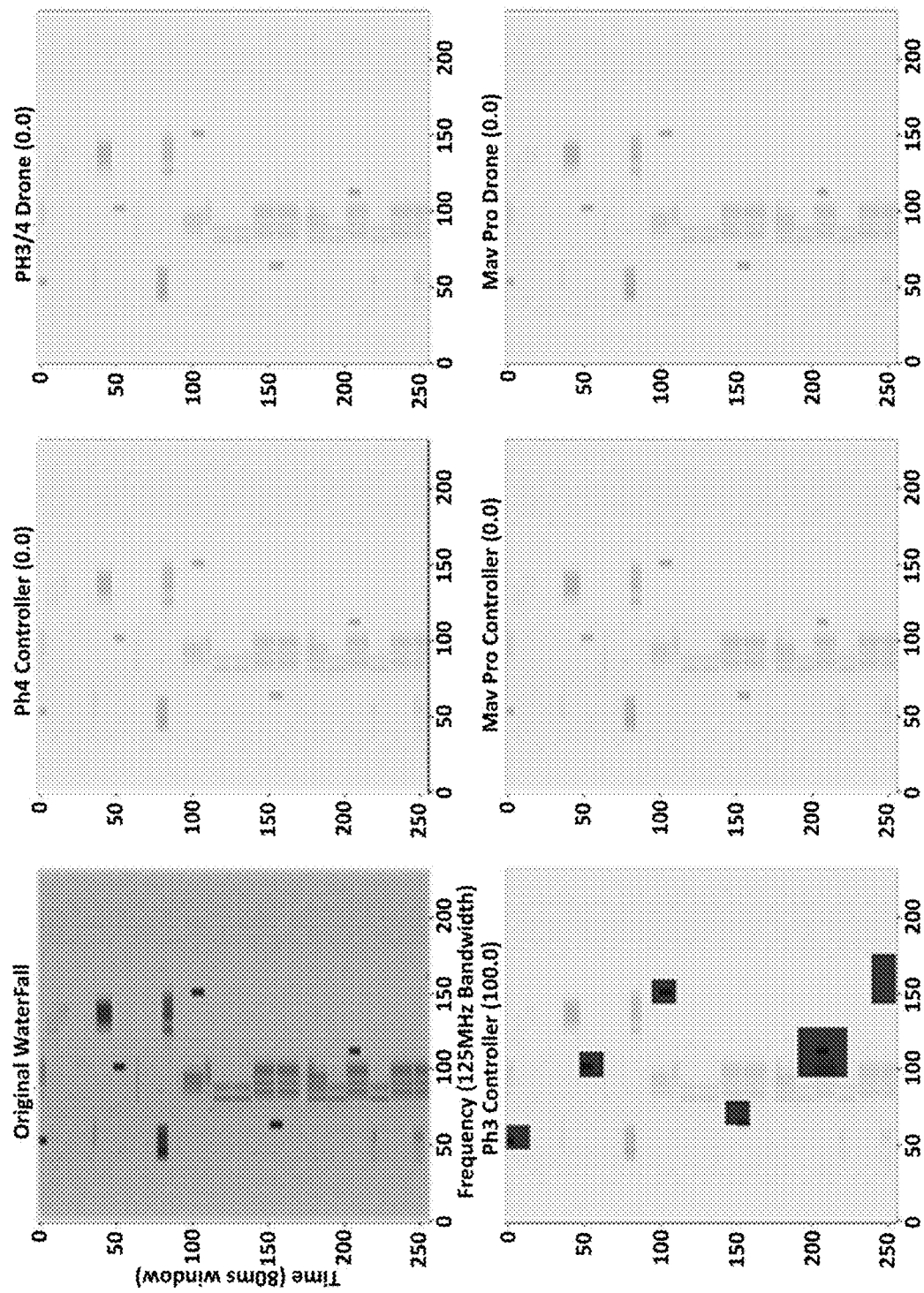
FIG. 13 illustrates a scenario for an RF environment with one Phantom 3 controller only.
Figure 14:
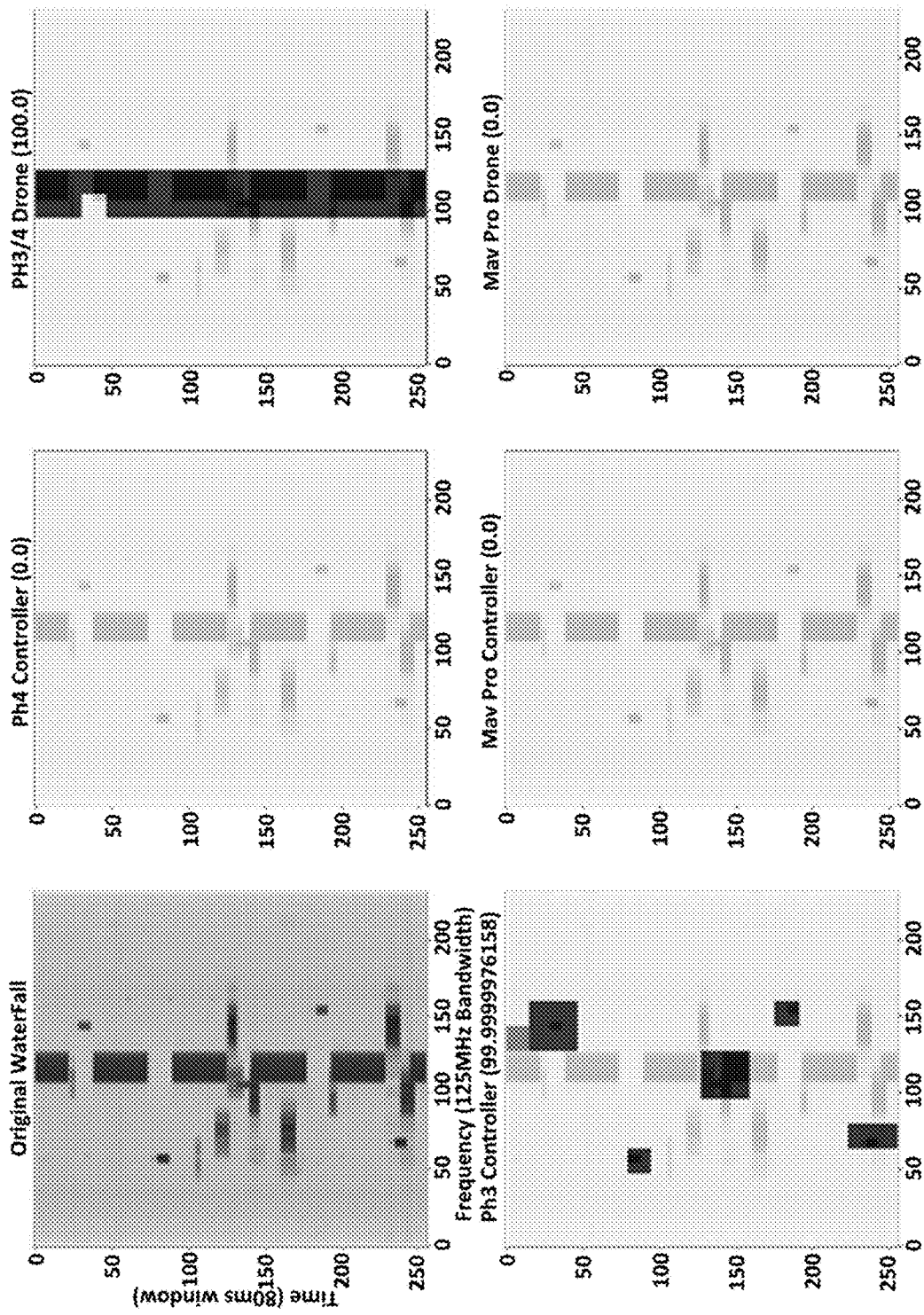
FIG. 14 illustrates a scenario for an RF environment with a Phantom 3 controller and drone.
Figure 15:
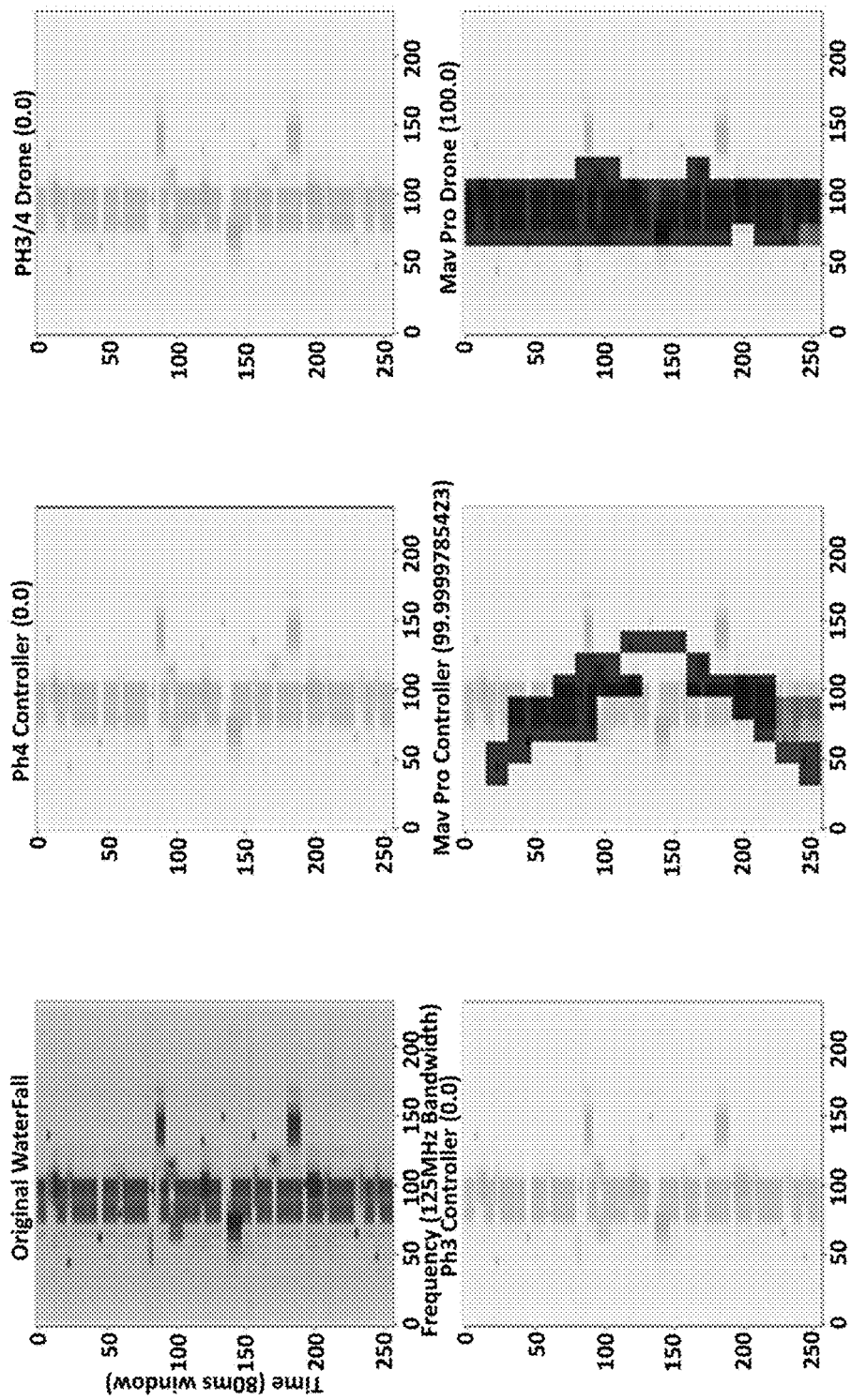
FIG. 15 illustrates a scenario for an RF environment with a Mavic Pro controller and drone in wideband mode.
Figure 16:
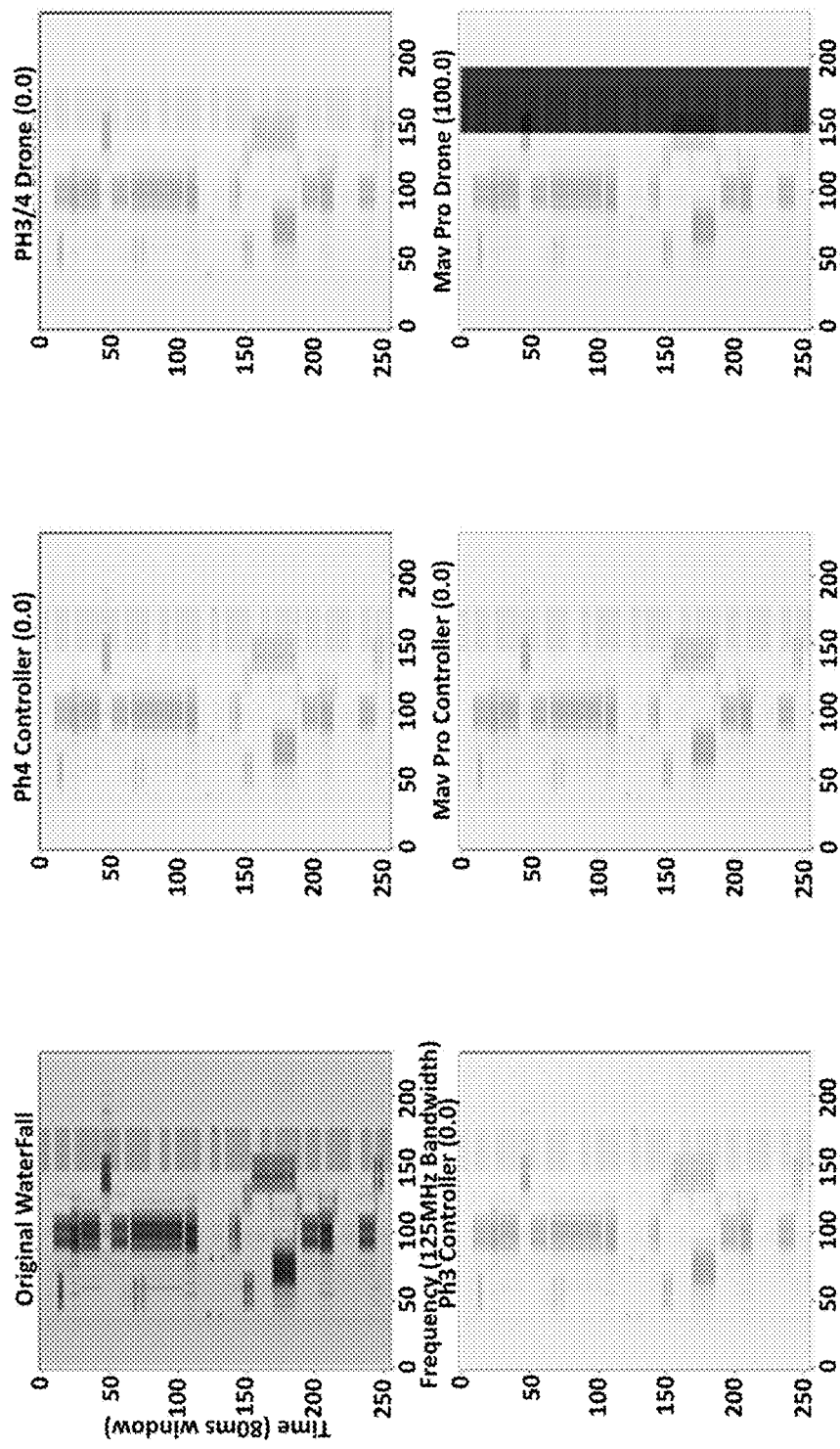
FIG. 16 illustrates a scenario for an RF environment with a Mavic Pro drone in wideband mode.
Figure 17:
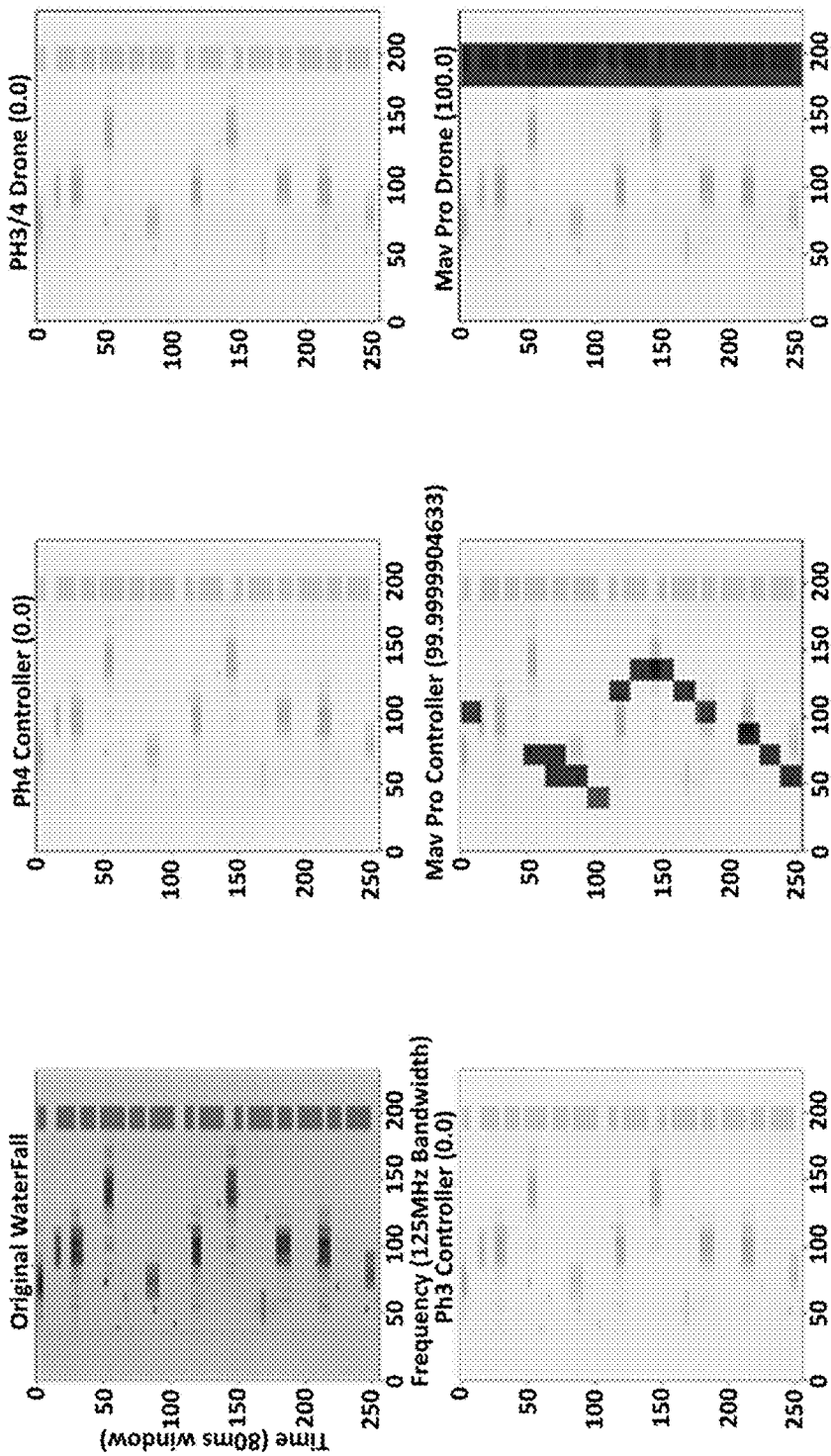
FIG. 17 illustrates a scenario for an RF environment with a Mavic Pro controller and drone.
Figure 18:
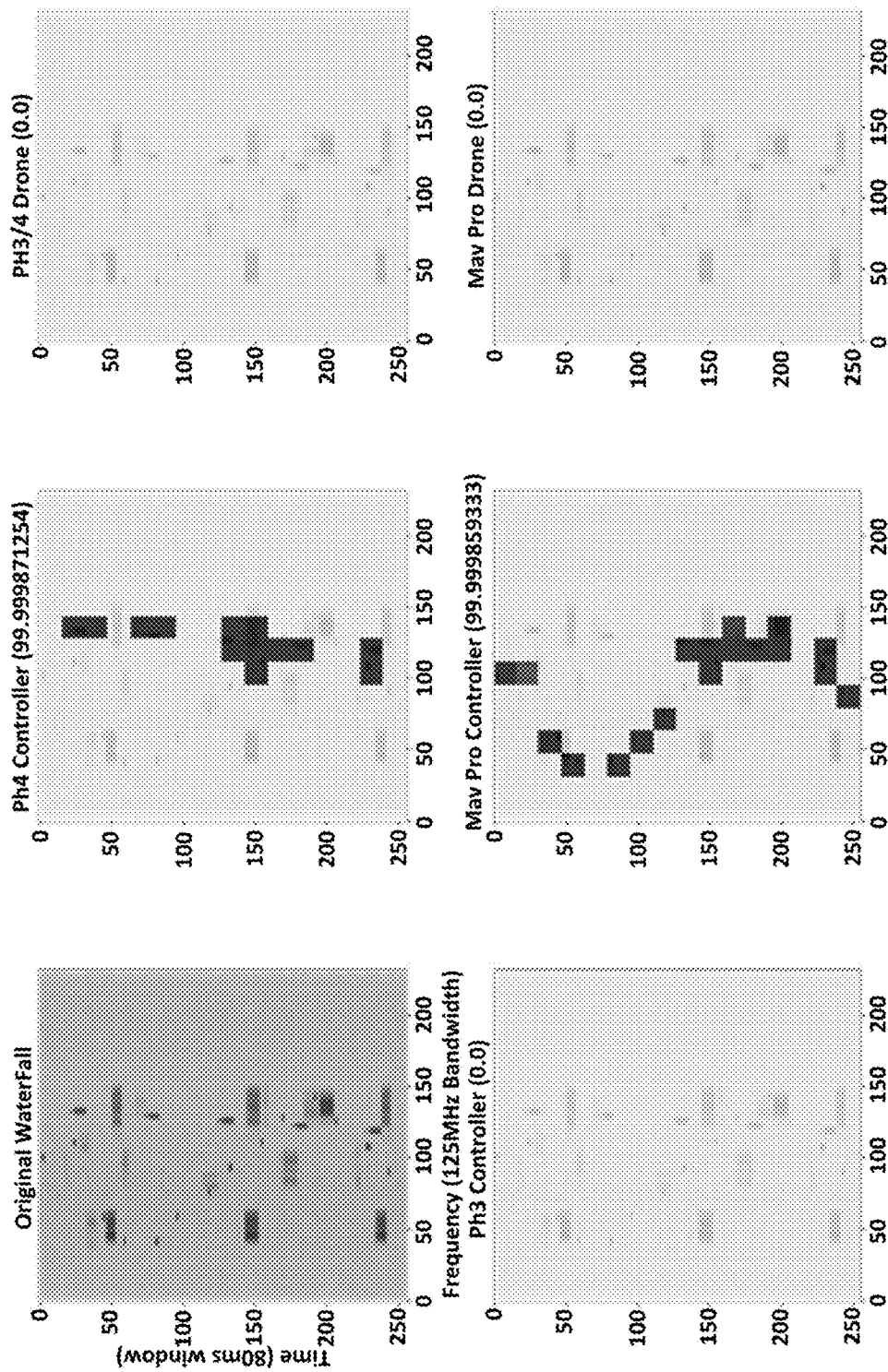
FIG. 18 illustrates a scenario for an RF environment with a Mavic Pro controller and a Phantom 4 controller.

The Artificial Intelligence (AI) algorithm is used to enhance performance for RF data analytics. The RF data analytics process based on the AI algorithm is visualized. The RF waterfalls of several drone scenarios are presented in FIGS. 8-18. FIG. 8 illustrates a scenario for an RF environment with just noise. FIG. 9 illustrates a scenario for an RF environment with a Phantom 4 controller and drone. FIG. 10 illustrates a scenario for an RF environment with two Mavic Pro drones. FIG. 11 illustrates a scenario for an RF environment with a Mavic Pro controller only. FIG. 12 illustrates a scenario for an RF environment with one Mavic Pro drone only. FIG. 13 illustrates a scenario for an RF environment with one Phantom 3 controller only. FIG. 14 illustrates a scenario for an RF environment with a Phantom 3 controller and drone. FIG. 15 illustrates a scenario for an RF environment with a Mavic Pro controller and drone in wideband mode. FIG. 16 illustrates a scenario for an RF environment with a Mavic Pro drone in wideband mode. FIG. 17 illustrates a scenario for an RF environment with a Mavic Pro controller and drone. FIG. 18 illustrates a scenario for an RF environment with a Mavic Pro controller and a Phantom 4 controller.

Each scenario is illustrated with 6 waterfall images. Each waterfall represents ~80 ms of time and 125 MHz of bandwidth. The top left image is the waterfall before an AI processing. The other five images are waterfalls after the AI processing. For each signal type, the areas of the waterfall that are likely for the RF signal type are highlighted. Areas that are not for the signal type are grayed out. The overall probability that a signal exists in the image is printed in the title of each waterfall image. In one embodiment, the AI algorithm is securely integrated with a state engine and a detection process of the present invention. In one embodiment, AI processing or processing of the waterfall includes a comparison of the waterfall image to a database of waterfall images of the RF environment or similar RF environments for which signals or noise were identified. The comparison of the waterfall image to the database of waterfall images is operable to be performed in real time or near real time. In one embodiment, the database of waterfall images is operable to be updated in real time or near real time with the waterfall image created based on the at least one tile and associated information with the waterfall image, including but not limited to the signal identified in the waterfall image, the signal type(s) identified in the waterfall image, and/or noise identified in the waterfall image.

The comparison includes the use of machine learning (ML) or convolutional neural networks (CNN) in one embodiment. In other embodiments, the node or system is operable to utilize a plurality of learning techniques for analyzing waterfall images including, but not limited to, artificial intelligence (AI), deep learning (DL), artificial neural networks (ANNs), support vector machines (SVMs), Markov decision process (MDP), and/or natural language processing (NLP). The node or system is operable to use any of the aforementioned learning techniques alone or in combination. Further, the node or system is operable to utilize predictive analytics techniques including, but not limited to, machine learning (ML), artificial intelligence (AI), neural networks (NNs) (e.g., long short term memory (LSTM) neural networks), deep learning, historical data, and/or data mining to make future predictions and/or models. The node or system is preferably operable to recommend and/or perform actions based on historical data, external data sources, ML, AI, NNs, and/or other learning techniques. The node or system is operable to utilize predictive modeling and/or optimization algorithms including, but not limited to, heuristic algorithms, particle swarm optimization, genetic algorithms, technical analysis descriptors, combinatorial algorithms, quantum optimization algorithms, iterative methods, deep learning techniques, and/or feature selection techniques.

In one embodiment, a method for drone detection and classification comprises applying FFT function to RF data, converting FFT data into logarithmic scale in magnitude, averaging converted FFT into 256 by 256 array representing 125 MHz of bandwidth and 80 ms of time as a base tile, applying normalization function to the base tile, applying a series of convolutional and pooling layers, applying modified You Only Look Once (YOLO) algorithm for detection, grouping bounding boxes displayed in the waterfall images (e.g., waterfall plots in FIGS. 8-18), classifying signals based on the shape of detection output, verifying results with a second level recurrent neural network (RNN) based pattern estimator.

In one embodiment, a method for training comprises recording clean RF signals, shifting RF signals in frequency randomly, creating truth data for YOLO output, adding a simulated channel to the RF signals, recording typical RF backgrounds, applying FFT function to RF data, converting FFT data into logarithmic scale in magnitude, averaging converted FFT into 256 by 256 array representing 125 MHz of bandwidth and 80 ms of time as a base tile, applying normalization function to the base tile, applying a series of convolutional and pooling layers, applying modified You Only Look Once (YOLO) algorithm for detection, grouping bounding boxes displayed in the waterfall images (e.g., waterfall plots in FIGS. 8-18), applying a sigmoid cross entropy function, and applying an Adaptive Moment Estimation (Adam) based back propagation algorithm.

In one embodiment, a drone detection engine is operable to convert FFT flows from a radio to a tile. For each channel, the drone detection engine is operable to standardize the FFT output from the radio at a defined resolution bandwidth, and group high resolution FFT data into distinct bins overtime. The drone detection engine is further operable to calculate average and standard deviation of power for discrete FFT bins, assign a power value to each channel within the tile. Each scan or single stare at the radio is a time slice, and multiple time slices with power and channel assignment create a tile. Tiles from different frequency spans and center frequencies are identified as a tile group by a tile group number. Receivers in the drone detection system are operable to be re-tuned to different frequencies and spans. In one embodiment, the drone detection system comprises multiple receivers to generate tiles and tile groups.

Figure 19:
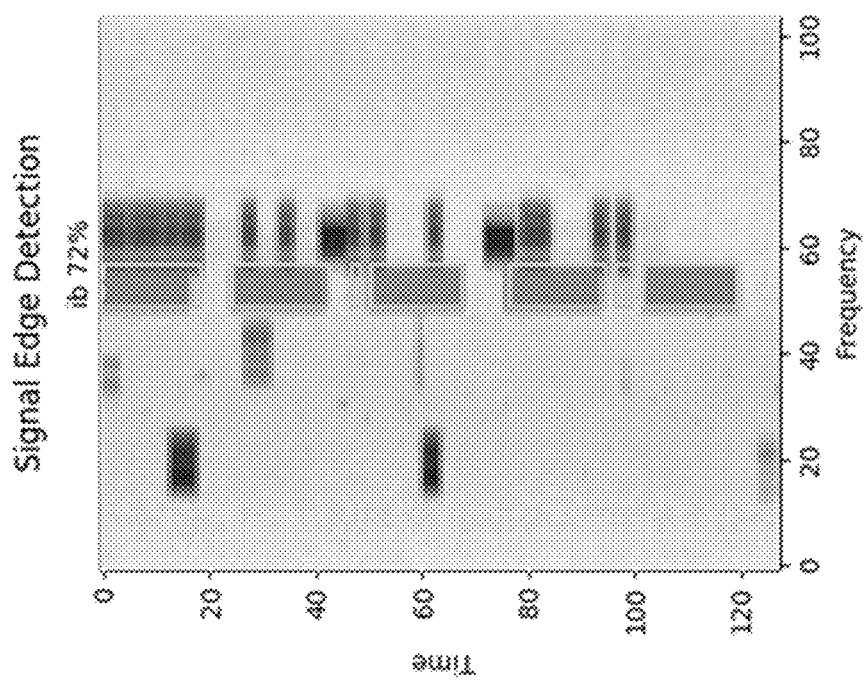
FIG. 19 is an illustration of identifying drones and controllers based on signal edge detection.

In one embodiment, a tile is sent to a YOLO AI Engine. Outputs of a decision tree in the YOLO AI engine are used to detect multiple drones and their controllers. Drones of the same type of radio protocol are operable to be identified within the tile. Controllers of the same type of radio protocol are operable to be identified within the tile. Drones of different radio protocols are also operable to be identified within the tile. Controllers of different radio protocols are also operable to be identified within the tile. FIG. 19 is an illustration of identifying drones and controllers based on signal edge detection.

In one embodiment, a plurality of tiles is sent to the YOLO AI engine. In one embodiment, a tile group is sent to the YOLO AI engine. The YOLO AI engine generates an output for each tile to identify drones and their controllers with a probability. An average probability is calculated based on outputs for multiple tiles in the tile group. For each tile group, the YOLO AI engine computes outputs for several tiles per second.

In one embodiment, a state engine controls the flows of tiles and tile groups into one or more AI engines. AI engines do not use frequency values for analytics. Thus, the one or more AI engines are operable for any frequency and frequency span that a drone radio supports. The state engine further correlates output of the one or more AI engines to appropriate tiles and tile groups.

The systems and methods of the present invention are operable for direction finding of drones and their controllers. Outputs from the AI engine are denoted with time basis for the drones and their controllers.

Drones typically maintain the same frequency unless their firmware detects interference. Then the drones may negotiate a change with their controllers. This does not create an issue for detection as long as the new frequency and span is monitored by the systems and methods of the present invention. Drone controllers typically use a frequency hopping spread spectrum (FHSS) or other Frequency hopping system (e.g., Gaussian frequency shift keying (GFSK)).

Figure 20:
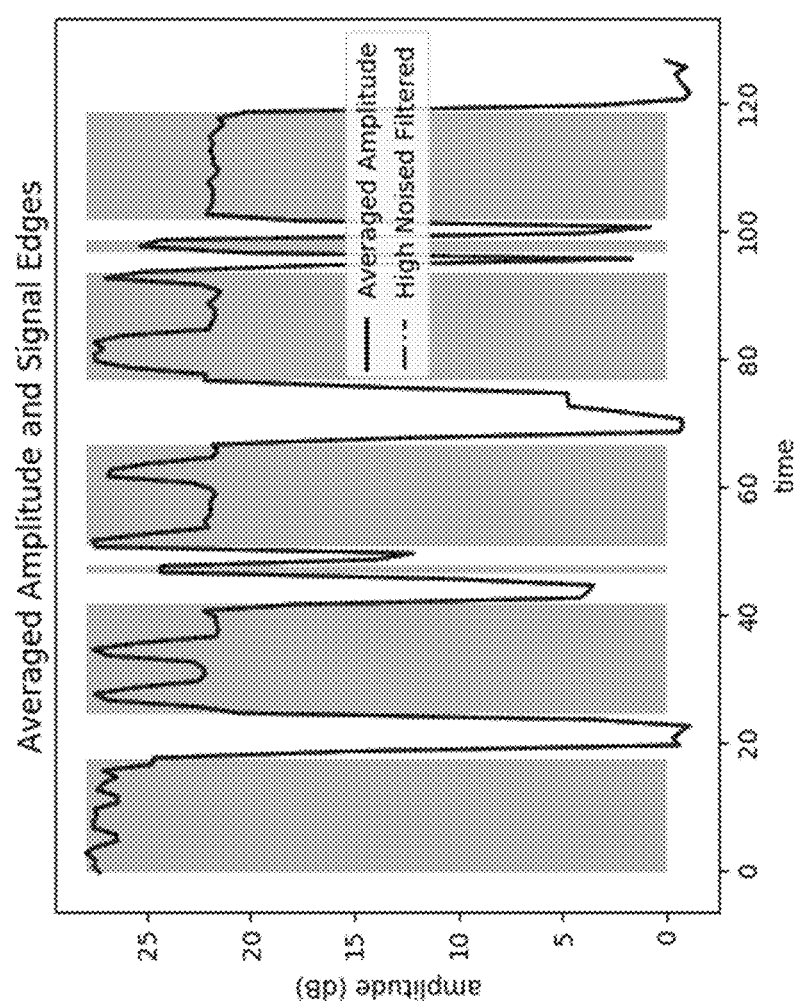
FIG. 20 is an illustration with averaged signal amplitudes and signal edges according to one embodiment of the present invention.

In one embodiment, the systems and method of the present invention are operable to approximate a start time of a line of bearing for a direction finding (DF) system. The time intervals are either known or estimated based upon the behavior monitored by the AI engine and state engine. This allows the time slice and frequency of each individual drone and/or controller to be passed to the DF system. In one embodiment, three or four receivers are coordinated to collect information in appropriate frequency segments, wherein the frequency segments are similar to tiles described earlier. FIG. 20 is an illustration with averaged signal amplitudes and signal edges according to one embodiment of the present invention.

The AI engine examines the segments to determine if a drone or controller exists. An azimuth of the drone or controller in an Earth-Centered Earth-Fixed coordinate system is determined based on other information collected from the three or four receivers using time difference of arrival (TDOA), angle of arrival (AOA), power correlative, or interferometry techniques.

Figure 21:
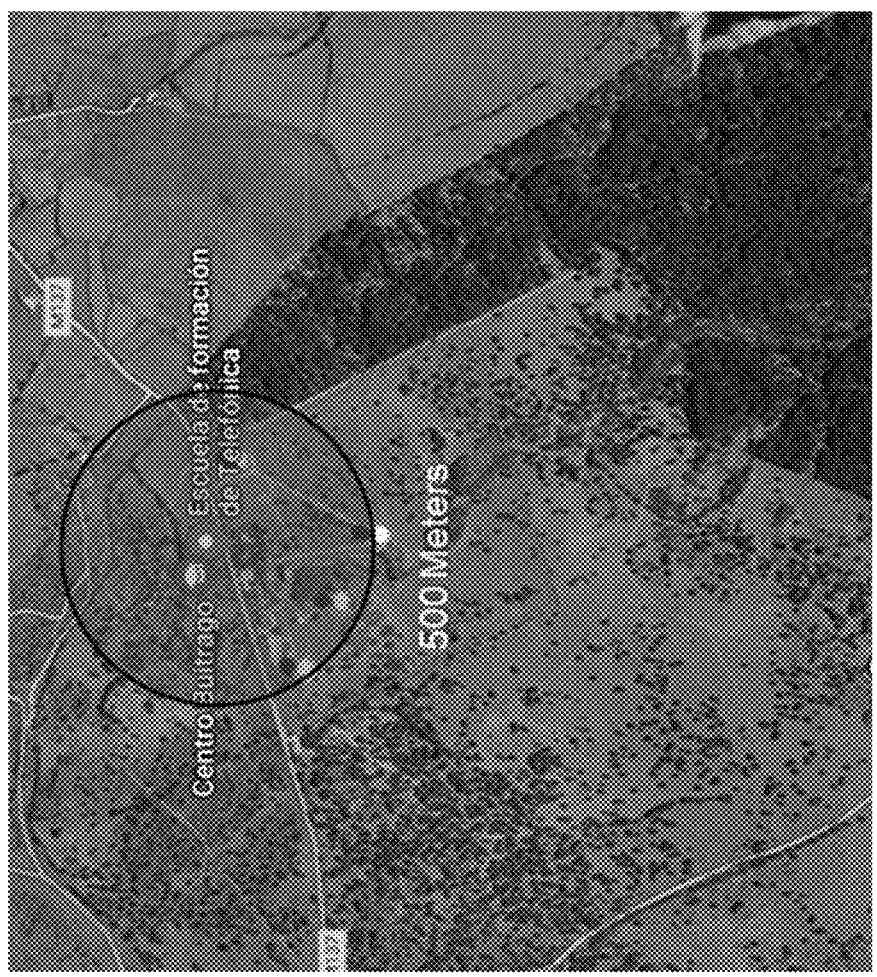
FIG. 21 displays a detection range of less than 500 meters based on equipment specification and location.

Distance capability of UAV detection and classification system depends on hardware configuration, environment morphology and restrictions based on country and classification of the counter UAV operator. In one embodiment, the systems and methods for unmanned vehicle recognition are operable to detect unmanned vehicles within 3-4 kilometers. FIG. 21 displays a detection range of less than 500 meters based on equipment specification and location.

Figure 22:
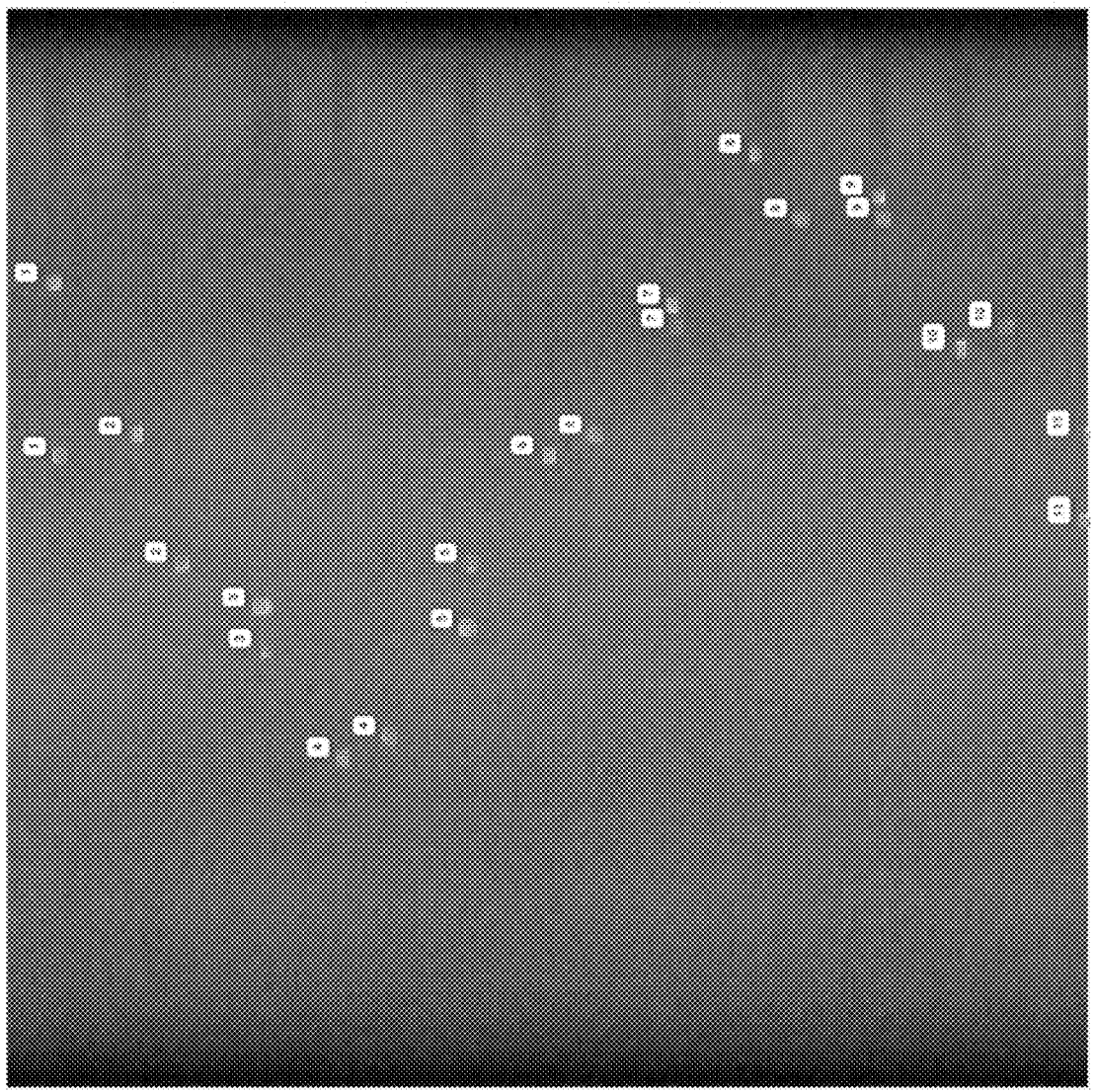
FIG. 22 displays a training data set containing two separate drone devices operating on the same type of radio protocol according to one embodiment of the present invention.
Figure 23:
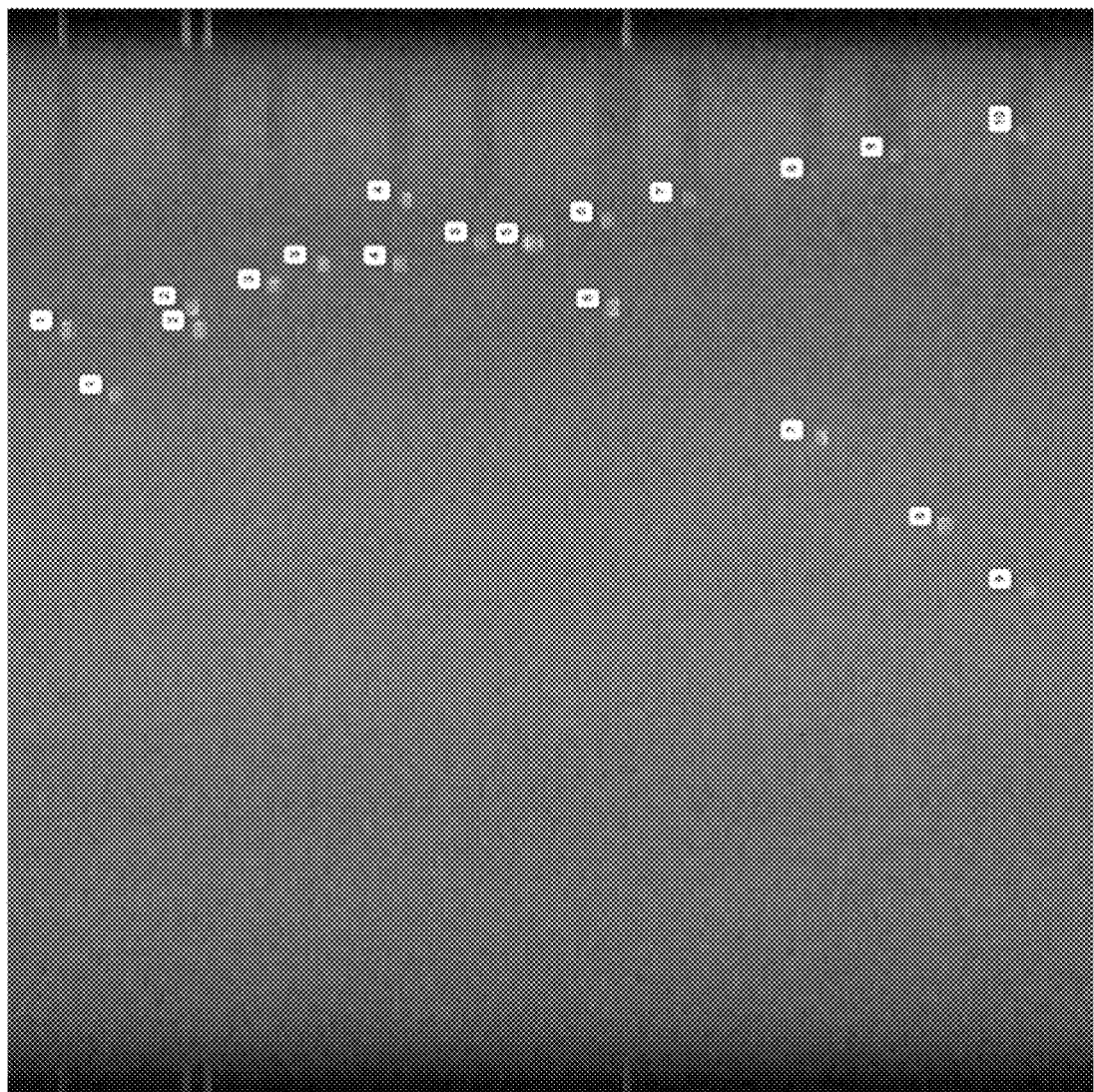
FIG. 23 displays a training data set containing two separate drone devices operating on different types of radio protocols according to one embodiment of the present invention.

In one embodiment, the systems and methods of the present invention are operable to utilize training data. In one embodiment training data contains at least one tile displaying at least one waterfall image for one or more drones. These images are numbered based on the time slices and color coded to keep track of each drone. The numbering and color coding of each drone is fed into the ML drone frequency hopping algorithm. The color coding and numbering of each drone signal allows for easy training of the image analysis algorithm to quickly pick up on trends in drone frequency hopping which allows for quick training of the algorithm to account for multiple drones and/or frequency hopping types. In one embodiment, one or more drones contain the same and/or different types of radio protocols within at least one tile. In one embodiment the training data is further utilizable by one or more AI engines operable for any frequency and frequency span supported by drone radio. In one embodiment, the AI engine is operable to use machine learning (ML), artificial intelligence (AI), You Only Look Once Artificial Intelligence (YOLO AI), deep learning (DL), neural networks (NNs), artificial neural networks (ANNs), convolutional neural networks (CNNs), support vector machines (SVMs), Markov decision process (MDP), natural language processing (NLP), control theory, and/or statistical learning techniques. FIG. 22 displays a tile containing drones of the same type of radio protocol. FIG. 23 displays training data of a tile containing drones of different types of radio protocols.

In one embodiment the AI and/or ML algorithm is operable to classify the drone and/or signal modulation type based on the waterfall image created by the signal. The training data and/or waterfall images are operable to be sets of known modulation schemes for drones for the ML algorithm to provide an image comparison to the signal in the RF environment. The known frequency hopping schemes are operable to be learned by the algorithm and then identified by pattern recognition when a signal in the environment is analyzed and put into a waterfall graphical representation. The image comparison ML or AI algorithm is operable to detect the modulation type patterns of the signal.

In one embodiment, the training data is operable to be utilized for "No Drone Zone" identification and avoidance. The Federal Aviation Administration (FAA) denotes areas where drones are unable to operate as "No Drone Zones", with each zone containing specific operating restrictions. To report "No Drone Zones" to recreational flyers, the FAA released B4UFLY—a service that allows recreational flyers to determine where drones are operable and not operable.

In one embodiment, the training data is operable to be fed to the ML Drone Frequency Hopping algorithm to allow for identification and avoidance of "No Drone Zones". In a further embodiment, the ML Drone Frequency Hopping algorithm is operable to cross reference detected signals with B4UFLY to determine if the signal is in a restricted area.

In one embodiment, the training data includes at least a tile or group of tiles representing a drone that is operable to exist in a "No Drone Zone". In one embodiment, the system utilizes the ML or AI Drone Frequency Hopping algorithm to confirm detection of a drone before cross referencing the signal with B4UFLY, the geolocation engine, and other sensors to determine if the drone has breached a "No Drone Zone". In one embodiment, other sensors include visual systems such as LIDAR, cameras and radar. The system is operable to interface with the multiple data sources, determine if the information from the multiple data sources is consistent or in agreement, and create a report identifying and determining if the drone has breached a "No Drone Zone". If the sensor information is not in agreement, the system is operable to discard the data and create a report identifying the faulty data.

In one embodiment, the present invention is operable to utilize training data to detect friendly drones (F-Drone) and nefarious drones (N-Drone). In one embodiment an F-Drone is identified by a specific radio protocol and/or a N-Drone is identified by not fitting into the desired radio protocol. In another embodiment, an N-Drone is identified by a desired radio protocol and/or a F-Drone is identified by not identifying with a targeted radio protocol. In a further embodiment one or more AI engines is operable to detect F-Drones and/or N-Drones utilizing training data. Training data is further utilizable by one or more AI engines that are operable for any frequency and frequency span supported by drone radio. In one embodiment, training data is operable to be utilized by one or more AI engines to define a "No Drone Zone". In a further embodiment, the AI engine is operable to detect a N-Drones by identifying a signal within the "No Drone Zone". In one embodiment training data is cross referenced with B4UFLY, the geolocation engine, and other sensors to embody parameters, including but not limited to altitude, to detect friendly and/or nefarious drones. In one embodiment, a report is created and sent identifying and detecting F-Drones and/or N-Drones.

Certain modifications and improvements will occur to those skilled in the art upon a reading of the foregoing description. The above-mentioned examples are provided to serve the purpose of clarifying the aspects of the invention and it will be apparent to one skilled in the art that they do not serve to limit the scope of the invention. All modifications and improvements have been deleted herein for the sake of conciseness and readability but are properly within the scope of the present invention.

What is claimed is:

1. A system for signal identification in a radiofrequency (RF) environment, comprising:
   at least one node device including a processor and memory;
   wherein the at least one node device is in communication with at least one artificial intelligence (AI) engine;
   wherein the at least one node device is operable to receive RF data based on the RF environment;
   wherein the at least one node device is operable to average Fast Fourier Transform (FFT) data derived from the RF data into at least one tile;
   wherein the at least one AI engine is operable to generate an output for the at least one tile to identify at least one signal;
   wherein the at least one tile is represented as at least one waterfall image; and
   wherein location information for the at least one signal is displayed on at least one user interface as at least one line of bearing.

2. The system of claim 1, wherein the at least one AI engine is operable to calculate an average probability based on the output.

3. The system of claim 1, wherein the at least one AI engine is trained using at least one training data set.

4. The system of claim 1, wherein a signal modulation type of the at least one signal includes direct sequence spread spectrum (DSSS), orthogonal frequency division multiplexing (OFDM), frequency hopping spread spectrum (FHSS), and/or Futaba advanced spread spectrum technology (FASST).

5. The system of claim 1, wherein the at least one signal includes a drone signal.

6. The system of claim 1, wherein the at least one node device is operable to transmit an alert and/or report related to a comparison of the location information of the at least one signal against at least one location of interest.

7. The system of claim 1, wherein the at least one line of bearing is calculated by a direction-finding engine.

8. The system of claim 1, wherein the at least one signal is highlighted on the at least one waterfall image.

9. The system of claim 1, further comprising at least one RF receiver operable to transform the RF data to the FFT data.

10. An apparatus for signal identification in a radiofrequency (RF) environment, comprising:
    a node device including a processor and memory;
    wherein the node device is in communication with at least one artificial intelligence (AI) engine;
    wherein the node device is operable to receive RF data;
    wherein the node device is operable to average Fast Fourier Transform (FFT) data derived from the RF data into at least one tile;

wherein the at least one AI engine is operable to generate an output for the at least one tile to identify and correspond at least one signal with a probability;

wherein the at least one tile is represented as at least one waterfall image; and wherein at least one line of bearing is displayed for the at least one signal on at least one user interface.

11. The apparatus of claim 10, wherein the at least one line of bearing represents location information for the at least one signal, including an airport no-fly-zone and/or at least one geofence.

12. The apparatus of claim 11, wherein the at least one node device is operable to transmit an alert and/or report related to a comparison of the location information of the at least one signal against at least one location of interest.

13. The apparatus of claim 10, wherein the at least one AI engine is operable to calculate an average probability based on the output.

14. The apparatus of claim 10, wherein the at least one AI engine is operable to be trained using at least one training data set.

15. The apparatus of claim 10, wherein the at least one line of bearing is calculated by a direction-finding engine.

16. A method for signal analysis in a radiofrequency (RF) environment, comprising:

at least one node device receiving Fast Fourier Transform (FFT) data derived from RF data based on the RF environment;

averaging the FFT data by the at least one node device into at least one tile and representing the at least one tile as at least one waterfall image;

generating an output for the at least one tile by at least one artificial intelligence (AI) engine in communication with the at least one node device to identify and correlate at least one signal with a probability;

classifying at least one signal emitting device by comparing the at least one signal emitted from the at least one signal emitting device to classification data stored in a classification library; and displaying at least one line of bearing for the at least one signal on at least one user interface.

17. The method of claim 16, wherein the at least one line of bearing represents location information for the at least one signal, including an airport no-fly-zone and/or at least one geofence.

18. The method of claim 17, further comprising the at least one node device transmitting an alert and/or report related to a comparison of the location information for the at least one signal against at least one location of interest.

19. The method of claim 16, wherein the at least one AI engine is trained using at least one training data set.

20. The method of claim 16, wherein the at least one signal characteristic includes a modulation type of the at least one signal that includes direct sequence spread spectrum (DSSS), orthogonal frequency division multiplexing (OFDM), frequency hopping spread spectrum (FHSS), and/or Futaba advanced spread spectrum technology (FASST).

* * * * *